United States Patent
Avantaggiati et al.

(10) Patent No.: US 12,270,652 B2
(45) Date of Patent: Apr. 8, 2025

(54) 4-POINTS PHASE AND SENSITIVITY ESTIMATION ALGORITHM AND RELATED ARCHITECTURE

(71) Applicant: InvenSense, Inc., San Jose, CA (US)

(72) Inventors: Vito Avantaggiati, Rome (IT); Carlo Pinna, Milan (IT); Federico Mazzarella, Binasco (IT)

(73) Assignee: InvenSense, Inc., San Jose, CA (US)

( * ) Notice: Subject to any disclaimer, the term of this patent is extended or adjusted under 35 U.S.C. 154(b) by 388 days.

(21) Appl. No.: 17/986,598

(22) Filed: Nov. 14, 2022

(65) Prior Publication Data

US 2023/0160696 A1 May 25, 2023

Related U.S. Application Data

(60) Provisional application No. 63/282,050, filed on Nov. 22, 2021.

(51) Int. Cl.
  *G01C 19/5649* (2012.01)
  *G01C 19/5656* (2012.01)
  *G01C 19/5776* (2012.01)
  *G01C 25/00* (2006.01)

(52) U.S. Cl.
  CPC ..... *G01C 19/5649* (2013.01); *G01C 19/5656* (2013.01); *G01C 19/5776* (2013.01); *G01C 25/00* (2013.01)

(58) Field of Classification Search
  USPC ...................................................... 702/104
  See application file for complete search history.

(56) References Cited

U.S. PATENT DOCUMENTS

| | | | |
|---|---|---|---|
| 11,236,999 B1 * | 2/2022 | Bhandari | G01C 19/5649 |
| 2015/0338217 A1 * | 11/2015 | Balachandran | G01C 19/5776 |
| | | | 73/504.12 |
| 2018/0231384 A1 * | 8/2018 | Johnson | G01C 19/5712 |
| 2019/0120657 A1 * | 4/2019 | Senkal | B81B 7/008 |

(Continued)

FOREIGN PATENT DOCUMENTS

| | | |
|---|---|---|
| CN | 112596533 A | 4/2021 |
| CN | 113108812 A | 7/2021 |

(Continued)

*Primary Examiner* — Paul D Lee
(74) *Attorney, Agent, or Firm* — Van Hoven PC; Joshua Van Hoven; Stefan D. Osterbur

(57) ABSTRACT

An algorithm and architecture for sense transfer function estimation injects one or more test signals from a signal generator into a MEMS gyroscope to detect an output signal (e.g., proof mass output sense signal), including an in-phase (e.g., Coriolis) component and a quadrature component. The in-phase and quadrature components are encoded with reference signals to determine phase and/or gain variation and are processed via a variety of components (e.g., matrix rotation, digital gain, tones demodulator, transfer function errors estimation, etc.) to estimate a sense transfer function of the MEMS (e.g., $H_s(f_d)$) and corresponding phase and/or gain offset of $H_s(f_d)$. The in-phase and quadrature components are also compensated for phase and/or gain offset by system components.

27 Claims, 13 Drawing Sheets

(56) References Cited

U.S. PATENT DOCUMENTS

2021/0033396 A1* 2/2021 Scafidi ................. G01C 25/005
2021/0262796 A1   8/2021 Dakshinamurthy et al.
2021/0364546 A1* 11/2021 Hughes ............... B81C 99/0045

FOREIGN PATENT DOCUMENTS

| CN | 113670485 A | 11/2021 |
| CN | 214748202 U | 11/2021 |
| CN | 214794871 U | 11/2021 |

* cited by examiner

4-POINTS PHASE AND SENSITIVITY ESTIMATION ALGORITHM AND RELATED ARCHITECTURE

CROSS-REFERENCE TO RELATED APPLICATIONS

This application claims the benefit of U.S. Provisional Patent Application No. 63/282,050, filed Nov. 22, 2021, the disclosure of which is hereby incorporated by reference herein in its entirety.

BACKGROUND

Numerous items such as smartphones, smart watches, tablets, automobiles, aerial drones, appliances, aircraft, exercise aids, and game controllers utilize sensors during their operation (e.g., motion sensors, pressure sensors, temperature sensors, etc.). In commercial applications, microelectromechanical system (MEMS) sensors such as accelerometers and gyroscopes capture complex movements and determine orientation or direction. For example, smartphones are equipped with accelerometers and gyroscopes to understand the movement of the smartphone, to augment navigation systems that rely on Global Positioning System (GPS) information, and to perform numerous other functions. Wearable devices and internet-of-things (IoT) devices constantly measure movement and other characteristics of a person, animal, or electronic device. In another example, drones and aircraft determine orientation based on gyroscope measurements (e.g., roll, pitch, and yaw) and vehicles of all types implement assisted driving to improve safety (e.g., to recognize skid or roll-over conditions).

Accelerometers or gyroscopes of a MEMS system, when housed in a MEMS chip, may be subject to certain manufacturing or in-field external stresses. During manufacturing, typical tolerances may result in the MEMS chip experiencing certain imparted forces as stress. Component installation during production processes, such as soldering, can induce forces absorbed by the MEMS chip as stress. Other manufacturing processes with stress-inducing conditions may occur during packaging such as the MEMS system susceptibility to board-bending. In-field stress sources may also vary. For example, the MEMS device may experience displacement of moving mechanical parts from normal wear and bending conditions from transport. An external stress impact on a MEMS system can propagate to cause a corresponding impact on the internal sensors of the system. In another example, a stress with a bending effect on the MEMS chip may correspond to a related stress experienced by the accelerometer or the gyroscope of the MEMS chip. Externally induced stresses can introduce errors into the accelerometer and/or gyroscope measurements. Changes in environmental conditions such as temperature may result in stresses imparted on the MEMS chip as well. These stresses may result in measurement errors of a MEMS sensor such as a MEMS accelerometer or a MEMS gyroscope. Further, measurement error in a MEMS gyroscope and/or an accelerometer may occur because of drift or error in drive signal input.

Measurement errors and/or inconsistent performance may result from temporary or permanently induced stresses on the mechanical structure, e.g., caused by temperature changes and/or aging of a device. In general, sensitivity variations depend on variations of transfer function amplitude, while offset errors depend on variations of the transfer function phase. It is desired to minimize such errors and stabilize performance through variations in temperature and throughout a device lifecycle, including the process of manufacturing boards where the MEMS sensor is mounted or soldered.

SUMMARY

In an embodiment of the present disclosure, a method for estimating the variation of a microelectromechanical system (MEMS) sensor transfer function includes imparting a drive signal to one or more drive electrodes of a MEMS sensor, the drive signal having a drive frequency, applying a plurality of test signals to a proof mass sense signal to create a modified proof mass sense signal, where the plurality of test signals includes a plurality of frequencies, each of the plurality of frequencies different from the drive frequency, and driving a gyroscope of the MEMS sensor based on the modified proof mass sense signal, thereby injecting the plurality of test signals into a proof mass output sense signal. In some embodiments, any number of test signals and any type of test signal (e.g., sinusoidal tone, in-band tone, out-of-band tone, etc.) may be applied to modify the proof mass sense signal. The method further comprises receiving the proof mass output sense signal from the MEMS sensor, extracting an in-phase component and a quadrature component from the proof mass output sense signal, processing the in-phase component and the quadrature component based on the plurality of frequencies of the plurality of test signals, and determining a change in demodulation phase, or in a gain of the device, based on the processing of the in-phase component and the quadrature component.

In an embodiment of the present disclosure, a system for estimating the variation of a microelectromechanical system (MEMS) sensor transfer function comprises processing circuitry configured to impart a drive signal to one or more drive electrodes of a MEMS sensor, the drive signal having a drive frequency, apply a plurality of test signals to a proof mass sense signal to create a modified proof mass sense signal, where the plurality of test signals comprises a plurality of frequencies, each of the plurality of frequencies different from the drive frequency, and drive a gyroscope of the MEMS sensor based on the modified proof mass sense signal, thereby injecting the plurality of test signals into a proof mass output sense signal. The processing circuitry of the system is further configured to, after receiving the proof mass output sense signal from the MEMS sensor, extract an in-phase component and a quadrature component from the proof mass output sense signal, process the in-phase component and the quadrature component based on the plurality of frequencies of the plurality of test signals and the drive signal, and determine a change in demodulation phase, or in a gain of the device, based on the processing of the in-phase component and the quadrature component.

In an embodiment of the present disclosure, a gyroscope for estimating the variation of a microelectromechanical system (MEMS) sensor transfer function comprises test signal generation circuitry, a drive mass, and a proof mass. The gyroscope further comprises processing circuitry configured to impart a drive signal to one or more drive electrodes of a MEMS sensor, the drive signal having a drive frequency, apply a plurality of test signals to a proof mass sense signal to create a modified proof mass sense signal, where the plurality of test signals comprises a plurality of frequencies, each of the plurality of frequencies different from the drive frequency, and drive the proof mass of the MEMS sensor based on the modified proof mass sense signal, thereby injecting the plurality of test signals into a proof mass output sense signal. In further embodiments, processing circuitry receives the proof mass output sense signal from the MEMS sensor, extracts an in-phase component and a quadrature component from the proof mass output sense signal, processes the in-phase component and the quadrature component based on the plurality of frequencies of the plurality of test signals and the drive signal, and determines a change in demodulation phase, or in a gain of the device, based on the processing of the in-phase component and the quadrature component.

BRIEF DESCRIPTION OF DRAWINGS

The above and other features of the present disclosure, its nature, and various advantages will be more apparent upon consideration of the following detailed description, taken in conjunction with the accompanying drawings in which.

DETAILED DESCRIPTION

Example approaches herein may generally minimize error and stabilize performance despite variations in temperature and aging of a MEMS device. In some examples, control mechanisms may be implemented (e.g., feedback and feed forward) to reduce error and stabilize performance. In at least some examples, changes of the sensor transfer function, both the amplitude and the phase, are measured and corrected to recover the relevant errors of the sensitivity and the offset, respectively. Among errors caused by stresses, phase errors may be more significant since relatively small errors may generate great variation of offset when the quadrature component coming from the MEMS device is very high. However, example methods herein are also suitable for sensitivity compensation, as they include a method for estimating the variation of the MEMS sensor transfer function.

Figure 1:
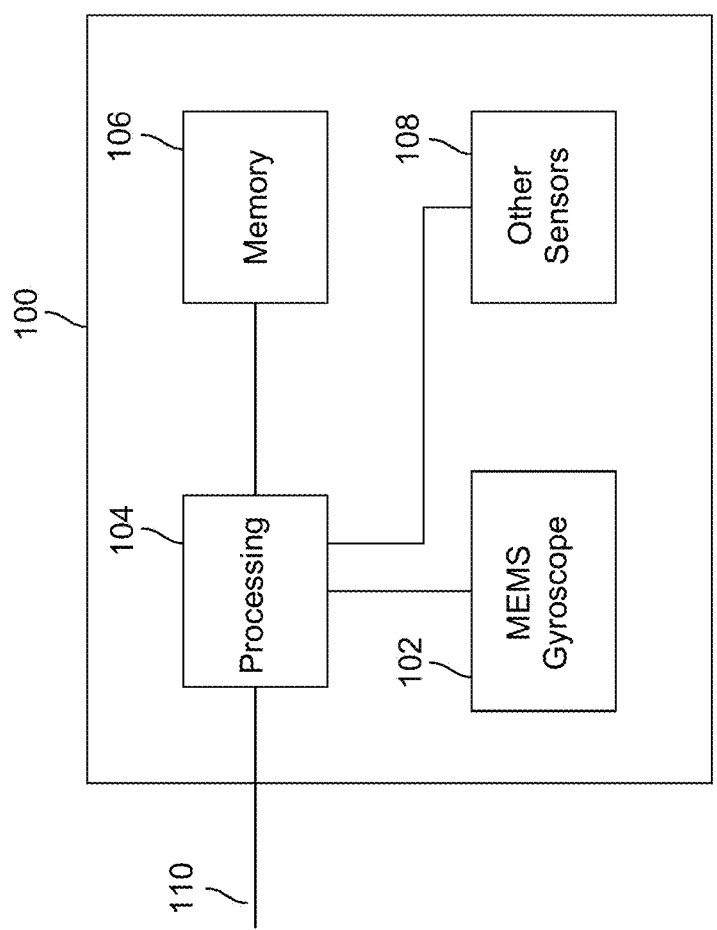
FIG. 1 shows an illustrative MEMS system in accordance with an embodiment of the present disclosure.

FIG. 1 shows an illustrative MEMS system 100 in accordance with an embodiment of the present disclosure. Although particular components are depicted in FIG. 1, it will be understood that other suitable combinations of the MEMS, processing components, memory, and other circuitry may be utilized as necessary for different applications and systems. In certain embodiments of the present disclosure, the circuitry, devices, systems, and methods described herein may be described in the context of a system including control circuitry configured to apply a plurality of test signals to a proof mass sense signal to generate an output signal (e.g., a proof mass output sense signal), extract an in-phase component and a quadrature component from the output signal, and process the in-phase and quadrature components to determine a change in demodulation phase of the MEMS sense transfer function. It will be understood that the circuitry, devices, systems, and methods described herein may be applied to other types of MEMS devices or sensors.

Processing circuitry 104 may include one or more components providing necessary processing based on the requirements of the MEMS system 100. In some embodiments, processing circuitry 104 may include hardware control logic that may be integrated within a chip of a sensor (e.g., on a base substrate of a MEMS gyroscope 102 or other sensor 108, or on an adjacent portion of a chip to the MEMS gyroscope 102 or other sensor 108) to control the operation of the MEMS gyroscope 102 or other sensors 108 and perform aspects of processing for the MEMS gyroscope 102 or the other sensors 108. In some embodiments, the MEMS gyroscope 102 and other sensors 108 may include one or more registers that allow aspects of the operation of hardware control logic to be modified (e.g., by modifying a value of a register). In some embodiments, processing circuitry 104 may also include a processor such as a microprocessor that executes software instructions, e.g., that are stored in memory 106. The microprocessor may control the operation of the MEMS gyroscope 102 by interacting with the hardware control logic and processing signals received from MEMS gyroscope 102. The microprocessor may interact with other sensors 108 in a similar manner. In some embodiments, some or all of the functions of the processing circuitry 104, and in some embodiments, of memory 106, may be implemented on an application specific integrated circuit ("ASIC") and/or a field programmable gate array ("FPGA"). In some embodiments, MEMS gyroscope 102 may be referred to as a variety of MEMS sensors (e.g., an accelerometer, a barometer, an inertial measurement unit, a magnetometer, etc.).

Although in some embodiments (not depicted in FIG. 1), the MEMS gyroscope 102 or other sensors 108 may communicate directly with external circuitry (e.g., via a serial bus or direct connection to sensor outputs and control inputs), in an embodiment the processing circuitry 104 may process data received from the MEMS sensor 102 and other sensors 108 and communicate with external components via a communication interface 110 (e.g., a serial peripheral interface (SPI) or I2C bus, in automotive applications a controller area network (CAN) or Local Interconnect Network (LIN) bus, or in other applications a suitably wired or wireless communications interface as is known in the art). The processing circuitry 104 may convert signals received from the MEMS gyroscope 102 and other sensors 108 into appropriate measurement units (e.g., based on settings provided by other computing units communicating over the communication bus 110) and perform more complex processing to determine measurements such as orientation or Euler angles, and in some embodiments, to determine from sensor data whether a particular activity (e.g., walking, running, braking, skidding, rolling, etc.) is taking place. In some embodiments, some or all of the conversions or calculations may take place on the hardware control logic or other on-chip processing of the MEMS gyroscope 102 or other sensors 108.

In some embodiments, certain types of information may be determined based on data from multiple MEMS gyroscopes 102 and other sensors 108 in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

In accordance with the present disclosure, a phase-locked loop (PLL) actuates a drive signal having a drive frequency to displace a drive mass, via drive electrodes, and generates a proof mass sense signal. A plurality of test signals may be injected into MEMS gyroscope 102, via test and calibration electrodes (e.g., self-test or quadrature electrodes), to create a modified proof mass sense signal, which drives a proof mass of the MEMS gyroscope 102 and generates an output signal (e.g., a proof mass output sense signal) detected by sense electrodes. In some embodiments, the one or more test signals may include a first test tone, $f_1$, having a first frequency and a second test tone, $f_2$, having a second frequency different from the first frequency. It will be understood that the first frequency of the first test tone, $f_1$, and the second frequency of the second test tone, $f_2$, may each represent offsets of the test tone frequencies from the drive frequency, $f_d$, of the drive signal. In some embodiments, the first test tone, $f_1$, and the second test tone, $f_2$, may each have a lower frequency than the drive frequency, $f_d$. After the modulation of the respective test tones in the MEMS gyroscope 102, however, 4 frequencies (e.g., $f_d-f_2$, $f_d-f_1$, $f_d+f_1$, $f_d+f_2$) are generated, where two frequencies are less than $f_d$ (e.g., $f_d-f_2$ and $f_d-f_1$) and two frequencies are greater than $f_d$ (e.g., $f_d+f_1$ and $f_d+f_2$). In some embodiments, the first frequency and the second frequency may be outside an intended signal bandwidth range for the MEMS gyroscope 102. An in-phase and quadrature component are respectfully extracted from the output signal (e.g., proof mass output sense signal) and processed based on, e.g., the first frequency of the first test tone to determine a change in demodulation phase. In some embodiments, the in-phase and quadrature component may be processed based on the second frequency of the second test tone. In some embodiments, the one or more test signals may further include a third test tone having a third frequency, where the third frequency may be offset from the drive frequency of the drive signal. In some embodiments, the plurality of test signals may include a plurality of frequencies different from the drive frequency. A tone demodulator processes the in-phase component and the quadrature component of the output signal, which may include performing high frequency and low frequency signal processing. High frequency signal processing occurs when the single tone demodulator initially receives the output signal (e.g., proof mass output sense signal) generated by MEMS gyroscope 102 and integrates and downsamples the respective in-phase and quadrature components of the output signal based on, e.g. the first frequency of the first test tone with a velocity of variation of a sense transfer function. Low frequency signal processing is used to estimate both a phase and an amplitude of the sense transfer function after integration and downsample. In one embodiment, low frequency signal processing processes sense transfer function values (e.g., spectral points) via an inverse trigonometric (e.g., arctangent) function and a third order interpolation of the drive frequency to estimate phase. It will be understood that any interpolation order of the drive frequency may be used to estimate phase. In another embodiment, low frequency signal processing processes sense transfer function values (e.g., spectral points) via a square root of a sum of squares operation and the third order interpolation of the drive frequency to estimate amplitude (e.g., gain). In some embodiments, the processing of the in-phase and quadrature components of the output signal may further comprise an equalizer to flatten the gain and amplitude of the sense transfer function.

The aforementioned method and/or system allows for estimating the variation in the MEMS sensor transfer function in the presence of temporary (e.g., relating to temperature) and more permanent (e.g., relating to bend, soldering, attrition or aging over lifecycle, etc.) stresses impacting the MEMS gyroscope 102. Estimating and tracking the variation in the phase and the amplitude of the MEMS sense transfer function enables compensation of such errors to correct them in a way to recover inaccuracies in sensitivity and offset respectively and improved stabilization of the MEMS gyroscope 102 over time. Otherwise, induced stresses on the mechanical structure of the MEMS gyroscope 102 may cause measurement errors and/or inconsistency.

Figure 2:
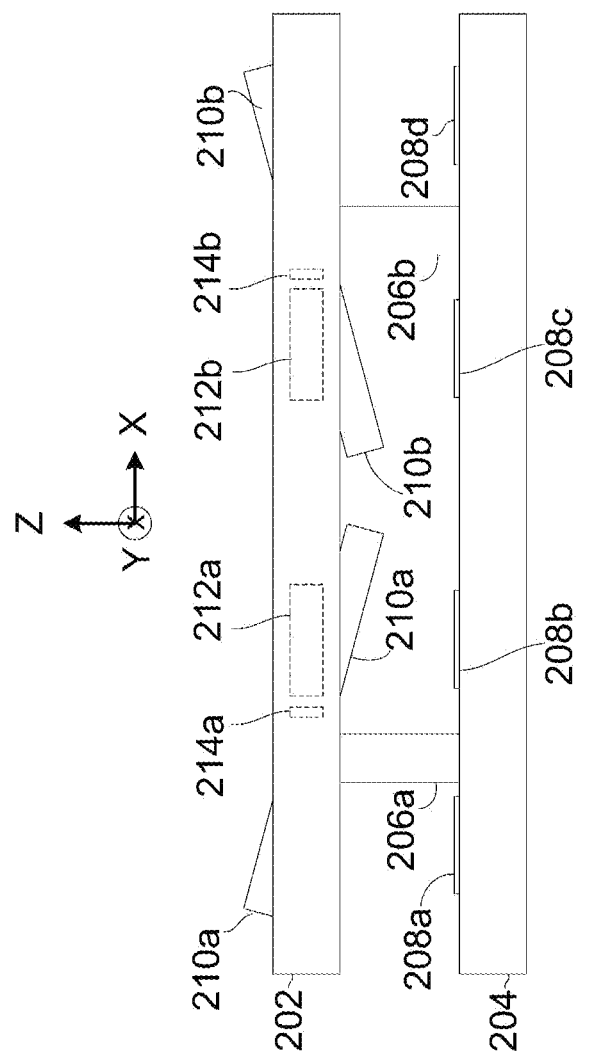
FIG. 2 shows an illustrative MEMS gyroscope in accordance with an embodiment of the present disclosure.

FIG. 2 shows an illustrative MEMS gyroscope 200 in accordance with an embodiment of the present disclosure. The exemplary MEMS gyroscope 200 of FIG. 2 is simplified for the purposes of illustration. It will be understood that a MEMS gyroscope as described in the present disclosure may include any suitable MEMS gyroscope design, including single-axis or multi-axis MEMS gyroscopes. Although portions of the present disclosure may be described in the context of a particular type of MEMS gyroscope configuration (e.g., a single-axis out-of-plane sensing gyroscope), it will be understood that the present disclosure may apply equally to other types and configurations of MEMS devices.

As illustrated in FIG. 2, the MEMS gyroscope 200 may include MEMS layer 202, substrate layer 204 (e.g., a complementary metal-oxide-semiconductor (CMOS) substrate layer), and anchors 206a, 206b separating the layers and located within a gap between the two layers. Packaging and additional layers (e.g., a cap layer) are not shown in FIG. 2 for ease of illustration but may be coupled to the MEMS layer 202 and/or substrate layer 204 to form a hermetically sealed cavity in which the movable MEMS components of a suspended spring-mass system (e.g., drive masses 212a, 212b), Coriolis masses (not depicted), proof masses 210a, 210b, and additional springs and/or masses coupled thereto (not depicted) are able to move. The cavity may have a nominal pressure (e.g., at or near a vacuum pressure, or another suitable pressure for other particular designs). In the exemplary embodiment of FIG. 2, a bottom plane of the suspended spring-mass system of the MEMS layer 202 is located parallel to an upper plane of the substrate layer 204 and proof mass sense electrodes 208a-208d are located thereon. Drive mass sense electrodes 214a, 214b are located adjacent to the drive masses 212a, 212b for sensing movement thereof (e.g., imparted by drive electrodes, not depicted in FIG. 2).

MEMS layer 202 includes a suspended spring-mass system including proof masses 210a, 210b and drive masses 212a, 212b, which are suspended from anchors 206a, 206b, respectively, by interconnected springs and/or masses (not visible in FIG. 2). The components of the suspended spring-mass system are sized and configured in a manner to facilitate movement of the proof masses 210a, 210b in response to the movement of the drive masses 212a, 212b and an inertial force to be measured, e.g., angular velocity about an axis perpendicular to the drive axis. Although not depicted in FIG. 2, drive circuitry (e.g., a phase-locked loop (PLL)) may provide drive signals to the drive masses 212a, 212b of the suspended spring-mass system (e.g., via drive electrodes). For example, in a MEMS gyroscope, a drive signal may create a physical drive motion of one or more components (e.g., drive masses 212a, 212b) that in turn results in a Coriolis force experienced by the proof masses 210a, 210b when the gyroscope is rotated about an axis of interest. In an exemplary embodiment, the drive circuitry may provide the drive signal via one or more drive electrodes (e.g., a capacitive plate, comb electrode, etc.) located adjacent to components of the suspended spring-mass system (e.g., drive masses 212a, 212b, etc.). Drive mass sense electrodes 214a, 214b are each located at a fixed location adjacent to a respective drive mass 212a, 212b, and each outputs a signal (e.g., a capacitive signal) corresponding to the displacement of the respective drive mass 212a, 212b in response to the drive signal.

In the exemplary embodiment of FIG. 2, the proof masses are designed to move along the direction of the z-axis in response to the measured inertial force (e.g., rate of rotation or angular velocity for a gyroscope). For example, an illustrative MEMS gyroscope 200 includes a suspended spring-mass system including movable drive masses 212a, 212b and movable proof masses 210a, 210b, springs, and additional components such as lever arms and Coriolis masses (not depicted in FIG. 2, but located within and patterned from MEMS layer 202) connecting the drive masses to the proof masses. The springs and other movable components of the spring-mass system are coupled to the drive masses 212a, 212b and proof masses 210a, 210b and are selectively patterned and positioned such that they are relatively rigid in response to forces in directions in which it is not desired to impart the drive motion, or measure the inertial force, and relatively flexible in a direction in which a force is to be imparted or measured.

Proof mass 210a is suspended over proof mass sense electrodes 208a, 208b and proof mass 210b is suspended over proof mass sense electrodes 208c, 208d. In response to a z-axis movement of the proof masses due to an angular velocity experienced by a MEMS gyroscope (e.g., due to rotation of a device including a MEMS gyroscope about an axis perpendicular to the z-axis and the axis of the drive motion imparted by drive masses 212a, 212b), the proof masses 210a, 210b rotate out of the plane of the MEMS layer (e.g., about the y-axis) such that portions of the proof mass move closer to or farther away from respective proof mass sense electrodes, with the degree of rotation (e.g., how much the proof masses move with respect to the respective proof mass sense electrodes) based on the magnitude of the angular velocity and the motion imparted by the drive mass. The design of the suspended spring-mass system may be such that the proof masses 210a, 210b have minimal movement out of the MEMS plane in the absence of angular velocity about the sense axis.

In the exemplary embodiment of FIG. 2, the movement of the proof masses 210a, 210b out of the MEMS plane may be sensed using electrostatic sensing as depicted in FIG. 2. Fixed proof mass sense electrodes 208a, 208b, 208c, and 208d are located parallel to the proof masses (e.g., on substrate layer 204 below proof masses 210a, 210b) to form capacitors with portions of the proof masses (e.g., electrode 208a forms a capacitor with a first portion of proof mass 210a, electrode 208b forms a capacitor with a second portion of proof mass 210a, electrode 208c forms a capacitor with a first portion of proof mass 210b, and electrode 208d forms a capacitor with a second portion proof mass 210b). The capacitance of each of the proof masses may change based on the relative distance between each proof mass portion and its associated proof mass sense electrodes. In the embodiment of FIG. 2, these capacitances and the capacitances sensed by the drive mass sense electrodes are used by processing circuitry (e.g., in the substrate layer 204) to determine the inertial force (e.g., by demodulating and compensating the sensed movement of the proof masses to isolate the Coriolis force from other forces and signals, such as a quadrature signal of the MEMS gyroscope structure). Although electrostatic sensing is described in the embodiment of FIG. 2, it will be understood that other forms of sensing (e.g., piezoelectric, infrared, or magnetic) may be used in other embodiments. While some or all of the processing circuitry may be described as located within a substrate layer 204 (e.g., a CMOS substrate layer), in some embodiments a substrate may not include active processing components and may instead simply perform functions such as routing signals to other processing circuitry (e.g., on adjacent components to the MEMS sensor and/or stacked on layers above or below the substrate or cap of the MEMS sensor).

Figure 3:
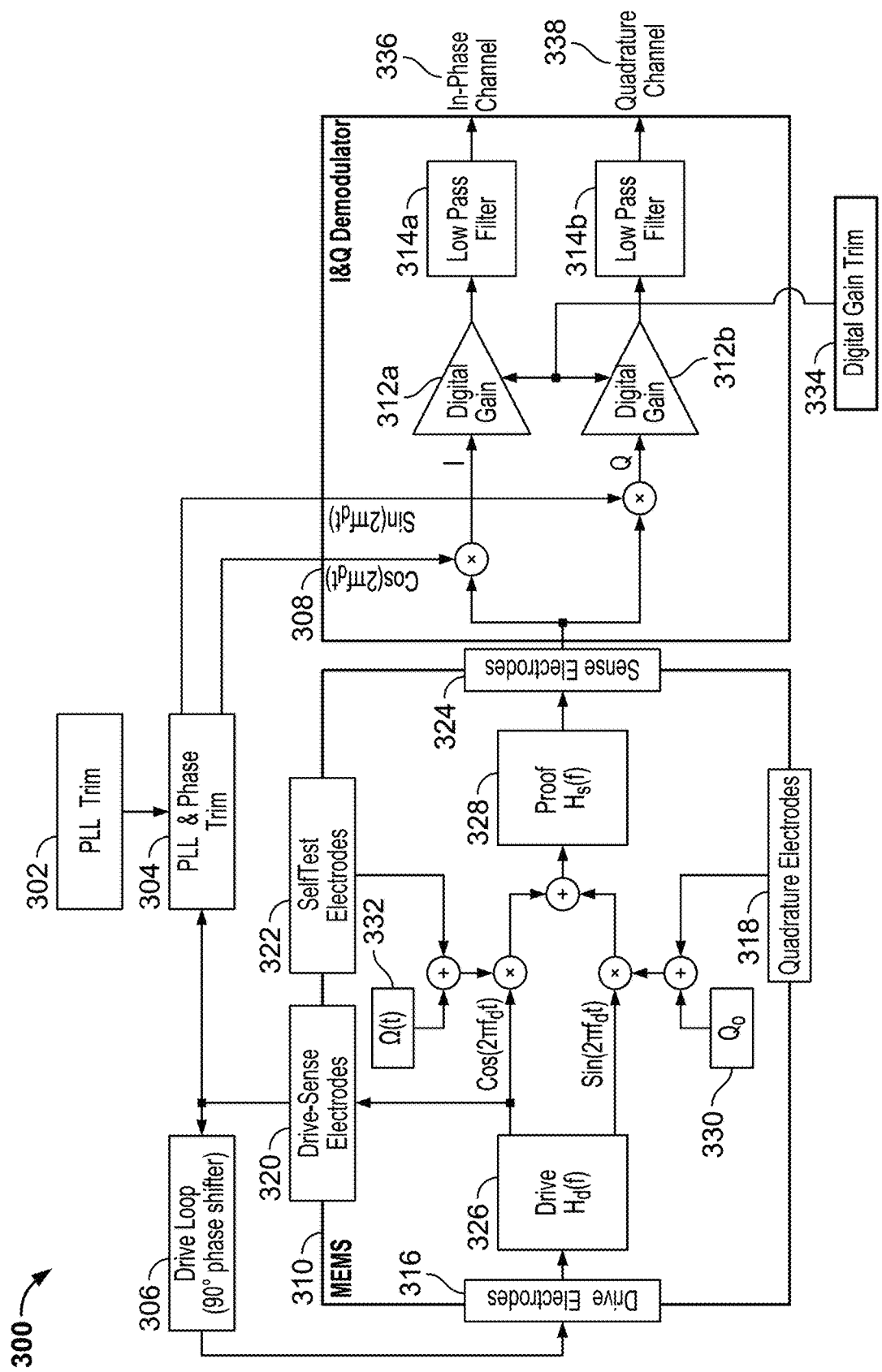
FIG. 3 shows an illustrative block diagram of a MEMS gyroscope and an in-phase and quadrature demodulation process in accordance with an embodiment of the present disclosure.

FIG. 3 shows an illustrative block diagram of a MEMS gyroscope and an in-phase and quadrature (I&Q) demodulation process in accordance with an embodiment of the present disclosure. In the depicted embodiment, system 300 includes phase-locked loop (PLL) trim 302, PLL and Phase trim 304, drive loop 306, a MEMS gyroscope 310, drive electrodes 316, drive mass 326, drive sense electrodes 320, quadrature electrodes 318, self-test electrodes 322, quadrature signal 330, Coriolis signal 332, proof mass 328, and proof mass sense electrodes 324. System 300 further includes demodulator 308, digital gain 312a, 312b, low pass filters 314a, 314b, in-phase channel 336, quadrature channel 338, and digital gain trim 334. In some embodiments, demodulator 308 may be referred to as an in-phase and quadrature (I&Q) demodulator. In an example, the MEMS gyroscope 310 is MEMS gyroscope 120 or 200. In the example illustrated in FIG. 3, an Amplification and an Analog to Digital conversion are not illustrated, although it will be understood that they may be implemented as part of the illustrated signal processing.

It will be understood that MEMS gyroscope 310 receives a drive signal, generated by a PLL loop (e.g., including PLL trim 302, PLL and Phase trim 304, and drive loop 306) of system 300, and, in response to the drive signal and an appropriately applied external force, generates an output signal (e.g., a proof mass output sense signal) that is received by demodulator 308, where an in-phase (e.g., Coriolis) component and a quadrature component are respectively extracted and processed. As described herein, one or more test signals are injected in the MEMS gyroscope 310 to modify a proof mass sense signal and a corresponding output signal (e.g., proof mass output sense signal), which in turn is used to estimate a variation in phase and gain (e.g., amplitude) of the MEMS sense transfer function with respect to an original or desired transfer function. Although particular components are depicted in certain configurations for system 300, it will be understood that components may be removed, modified, or substituted and that additional components (e.g., electrodes, masses, filters, etc.) may be added in certain embodiments.

A plurality of errors, induced by external stresses, with different timescales may affect the operation of MEMS gyroscope 310. In some embodiments, construction inaccuracies may cause errors that are normally measured at factory premises when the MEMS gyroscope 310 is offline (e.g., the MEMS gyroscope 310 is not working normally but it is in a special state dedicated to this testing and is then permanently compensated). In some embodiments, MEMS gyroscope 310 installation in its final application component (e.g., after soldering the MEMS gyroscope 310 on a printed circuit board (PCB) of a cellular phone, drone, gaming controller, etc.) may generate errors that may be measured after the installation and permanently compensated. This operation may be done when the MEMS gyroscope 310 is in a special state dedicated to a testing mode. In some embodiments, aging and usage of the MEMS gyroscope 310 may cause errors that need to be measured and compensated for several times during the lifespan of the MEMS gyroscope 310 (e.g., at each power on, once every month, etc.). Generally, the timescale for errors associated with MEMS gyroscope 310 attrition and aging may be very slow, e.g., in the range of many months and/or years. This operation may also be done when the MEMS gyroscope 310 is in a testing state dedicated to this testing feature and repeated on demand. In some embodiments, temperature may cause errors to occur during normal MEMS gyroscope 310 operation since temperature varies while the MEMS gyroscope 310 is normally in service. Accordingly, errors caused by temperature may need to be compensated with a mechanism working during normal MEMS gyroscope 310 operation with the ability to not affect MEMS gyroscope 310 functionality. A timescale for temperature errors may be every time the MEMS gyroscope 310 is requested to provide its normal functionality, or other suitable timescales based on number of uses, time of use, or passage of time without regard to usage.

MEMS gyroscope 310 includes a suspended spring-mass system, which further includes drive mass 326, drive sense electrodes 320 for generating a drive sense signal corresponding to the displacement of drive mass 326, and proof mass 328. In addition, MEMS gyroscope 310 includes self-test electrodes 322, Coriolis (e.g., in-phase) signal 332, quadrature electrodes 318, quadrature signal 330, and proof mass sense electrodes 324 for generating an output signal (e.g., a proof mass output sense signal) based on the displacement of proof mass 328. In some embodiments, MEMS gyroscope 310 may be an accelerometer or a variety of other sensors (e.g., a barometer, an inertial measurement unit, a magnetometer, etc.).

Phase-locked loop (PLL) & Phase Trim 304 is a control system that generates an output signal (e.g., a proof mass output sense signal), via MEMS gyroscope 310, with a phase related to a phase of a drive signal. PLL & Phase Trim 304 generates and delivers a drive signal, via drive loop 306 (e.g., a 90° phase shifter), to drive electrodes 316, which receive the drive signal at a particular drive frequency (e.g., 10 kHz) and displace drive mass 326 in accordance with the drive frequency. The displacement of drive mass 326 generates the drive sense signal, which is detected by drive sense electrodes 320. In some embodiments, the drive loop 306 may shift the phase of the drive signal by any degree amount depending on the amount of offset MEMS gyroscope 310 experiences due to external stresses. In some embodiments, PLL & Phase Trim 304 may be synchronized with the oscillation frequency of the drive system (e.g., the control system) and produce a higher frequency clock at a multiple (e.g., a harmonic) of the drive frequency. PLL and Phase trim 304 receives the drive sense signal, via drive sense electrodes 320, and processes the drive sense signal (e.g., precisely adjusts the phase of the drive sense signal to closely match the drive frequency, $f_d$) to create reference signals (e.g., $\cos(2\pi f_d t)$ and $\sin(2\pi f_d t)$) needed for demodulator 308. PLL Trim 302 is a set of constants and parameters (e.g., a memory), that normally are adjusted at factory premises, that are needed by PLL & Phase Trim 304 to correctly work. Demodulator 308 respectively receives the reference signals of the drive sense signal from PLL and Phase trim 304 at in-phase channel 336, which feeds to digital gain 312a, and quadrature channel 338, which feeds to digital gain 312b. It will be understood that the reference signals (e.g., $\cos(2\pi f_d t)$ and $\sin(2\pi f_d t)$) serve as a baseline and contribute to identifying phase and/or gain variation when encoding with in-phase (e.g., Coriolis) and quadrature components of the MEMS gyroscope 310 output signal (e.g., proof mass output sense signal). Equation (1) describes the output signal (e.g., the proof mass output sense signal) of the MEMS gyroscope 310 below:

$$x_s(t) = G_s(f_d)[\Omega(t)\cos(2\pi f_d t - \varphi_s(f_d)) - Q_o \sin(2\pi f_d t - \varphi_s(f_d))] \quad (1)$$

In this equation:
1) $G_s(f_d)$ is the gain of the signal, i.e., the amplitude of the MEMS sense transfer function at the drive frequency $f_d$
2) $\varphi_s(f_d)$ is the phase delay of the signal, i.e., the phase of the MEMS sense transfer function at the drive frequency $f_d$ In-phase (e.g., Coriolis) and quadrature components from the output signal (e.g., the proof mass output sense signal) are demodulated with reference signals (e.g., $\cos(2\pi f_d t)$ and $\sin(2\pi f_d t)$) from the drive sense signal at in-phase (e.g., Coriolis) channel 336 and quadrature channel 338 to identify phase and/or gain offset, related to quadrature signal 330 and/or Coriolis (e.g., in-phase) signal 332, before feeding into digital gain 312a, 312b. Digital gain 312a, 312b respectively compensates for gain variation within the in-phase (e.g., Coriolis) signal received at in-phase channel 336 and the quadrature signal received at quadrature channel 338. Digital gain trim 334 is incorporated into digital gain 312a, 312b to make precise changes to the amplitude (e.g., by either adding additional gain for a boost or attenuating the signal to reduce the gain) of either the in-phase (e.g., Coriolis) signal or the quadrature signal. In some embodiments, digital gain trim 334 may be actuated so that each of the in-phase (e.g., Coriolis) signal and the quadrature signal are more compatible with an external component (e.g., a matrix rotation, Tone demodulator, etc.) of system 300. Low pass filters 314a, 314b respectively receive the outputs of digital gain 312a, 312b, via in-phase channel 336 and quadrature channel 338, and filter out components of either the in-phase signal or the quadrature signal with frequencies above a certain threshold frequency (e.g., $2*f_d$). For example, the in-phase and quadrature components provided at the output of demodulator 308 may be described by equations (2) and (3) below:

$$x_{sI}(t)=2G_s(f_d)[\Omega(t)\cos(2\pi f_d t-\varphi_s(f_d))-Q_o \sin(2\pi f_d t-\varphi_s(f_d))]\cos(2\pi f_d t) \quad (2)$$

$$x_{sQ}(t)=-2G_s(f_d)[\Omega(t)\cos(2\pi f_d t-\varphi_s(f_d))-Q_o \sin(2\pi f_d t-\varphi_s(f_d))]\sin(2\pi f_d t) \quad (2)$$

Low pass filters 314a, 314b may remove certain frequency signal components at $2*f_d$ before the in-phase and quadrature signals are delivered to components external to system 300. After filtering operation, equations (2) and (3) reduce to the following equations (4) and (5):

$$x_{sI}(t)=G_s(f_d)[\Omega(t)\cos(\varphi_s(f_d))+Q_o \sin(\varphi_s(f_d))] \quad (4)$$

$$x_{sQ}(t)=G_s(f_d)[-\Omega(t)\sin(\varphi_s(f_d))-Q_o \cos(\varphi_s(f_d))] \quad (5)$$

Equations (4) and (5) depict explicit formulas for the in-phase (e.g., Coriolis) and quadrature components at baseband in absence of any compensation. The phase difference introduced by the MEMS sense transfer function, namely $\varphi_s(f_d)$, creates an unwanted crosstalk between the in-phase (e.g., Coriolis) component and the quadrature component. In some embodiments, if the quadrature signal $Q_o$ is high, the in-phase (e.g., Coriolis) component measured on the in-phase channel 336 may be affected by a significant offset error (e.g., $Q_o \sin(\varphi_s(f_d))$).

Processing circuitry within system 300 may compensate for phase shift $\varphi_s(f_d)$ within the output signal (e.g., the proof mass output sense signal), which creates crosstalk between the in-phase (e.g., Coriolis) and quadrature components with a phase adjustment capability that, e.g., may assign to the demodulation carriers a phase equal to $\varphi_s(f_d)$. In this way, equations (2) and (3) may be rewritten as equations (6) and (7) below, which represent the intermediate expressions of the in-phase (e.g., Coriolis) and quadrature components received by demodulator 308:

$$x_{sI}(t)=2G_s(f_d)[\Omega(t)\cos(2\pi f_d t-\varphi_s(f_d))-Q_o \sin(2\pi f_d t-\varphi_s(f_d))]\cos(2\pi f_d t-\varphi_s(f_d)) \quad (6)$$

$$x_{sQ}(t)=2G_s(f_d)[\Omega(t)\cos(2\pi f_d t-\varphi_s(f_d))+-Q_o \sin(2\pi f_d t-\varphi_s(f_d))]\sin(2\pi f_d t-\varphi_s(f_d)) \quad (7)$$

According to this compensation for the phase shift $\varphi_s(f_d)$, the final expression of the in-phase (e.g., Coriolis) component and the quadrature component is achieved after the filtering operation performed by filters 314a and 314b, so that the in-phase (e.g., Coriolis) component is received by the in-phase (e.g., Coriolis) channel 336 and the quadrature component is received by the quadrature channel 338, and they are decoupled as shown by equations (8) and (9) below:

$$x_{sI}(t)=G_s(f_d)\Omega(t) \quad (8)$$

$$x_{sQ}(t)=G_s(f_d)Q_o \quad (9)$$

The decoupling of the in-phase (e.g., Coriolis) and quadrature components resolves the crosstalk issue introduced by equations (4) and (5) above. Evaluation of the phase shift $\varphi_s(f_d)$ that allows decoupling the in-phase (e.g., Coriolis) channel 336 and the quadrature component is normally done by some trimming procedure at factory premises, using some test equipment. The method disclosed herein proposes a way to measure the phase shift $\varphi_s(f_d)$ in the device itself, when the device is in normal operating conditions. Furthermore, the method is suitable also to measure the gain $G_s(f_d)$ and to compensate it. Furthermore, since the method is suitable to work during normal operations of the device, it allows to track the variation of both $\varphi_s(f_d)$ and $G_s(f_d)$ during the device life, when the initial trimming is no more accurate due to variations occurred after the factory trimming.

In accordance with some embodiments of the disclosed method, one or more test signals may be injected into MEMS gyroscope 310 via quadrature electrodes 318, which contribute to the quadrature signal 330 by picking up MEMS gyroscope 310 inaccuracies and/or design impairments based on temporary stresses (e.g., temperature) and/or permanent stresses (e.g., bend in the MEMS gyroscope 310, imprecise soldering, attrition over the lifespan of the MEMS gyroscope 310, etc.), and/or via self-test electrodes 322, which contribute to the Coriolis (e.g., in-phase) signal 332. The test signals modify the proof mass sense signal (e.g., by adding some new information useful to evaluate the phase shift $\varphi_s(f_d)$ and the gain $G_s(f_d)$) and displace proof mass 328 with the modified proof mass sense signal to produce an output signal (e.g., a proof mass output sense signal), which is detected by proof mass sense electrodes 324 and delivered to demodulator 308 at in-phase (e.g., Coriolis) channel 336 and quadrature channel 338 (e.g., as separate, demodulated in-phase and quadrature components). In some embodiments, the proof mass output sense signal may be demodulated based on the drive frequency to create a baseband signal, from which a plurality of demodulated signals (e.g., demodulated in-phase and quadrature components) are created (e.g., by demodulating the baseband signal by each frequency of the plurality of test signals) and delivered to demodulator 308.

In some embodiments, the injected test signals may either occur as in-phase (e.g., Coriolis) or quadrature signals that include variations to be monitored to identify occurring errors (e.g., gain offset, phase offset, etc.) within the output signal around the drive frequency $f_d$. In some embodiments, the test signals injected in MEMS gyroscope 310 may be one or more sinusoidal tones, in-band or out-of-band, of the force signals that the MEMS gyroscope 310 is intended to detect. If a test signal is out-of-band, the disclosed method is suitable to work during normal sensor operations. In some embodiments, processing circuitry of MEMS gyroscope 310 may be configured to generate from the output signal (e.g., the proof mass output sense signal) a sense displacement quadrature signal and a sense displacement in-phase signal, where such displacement signals include the received test signals injected in the MEMS gyroscope 310 via self-test electrodes 322 and/or quadrature electrodes 318.

Figure 4:
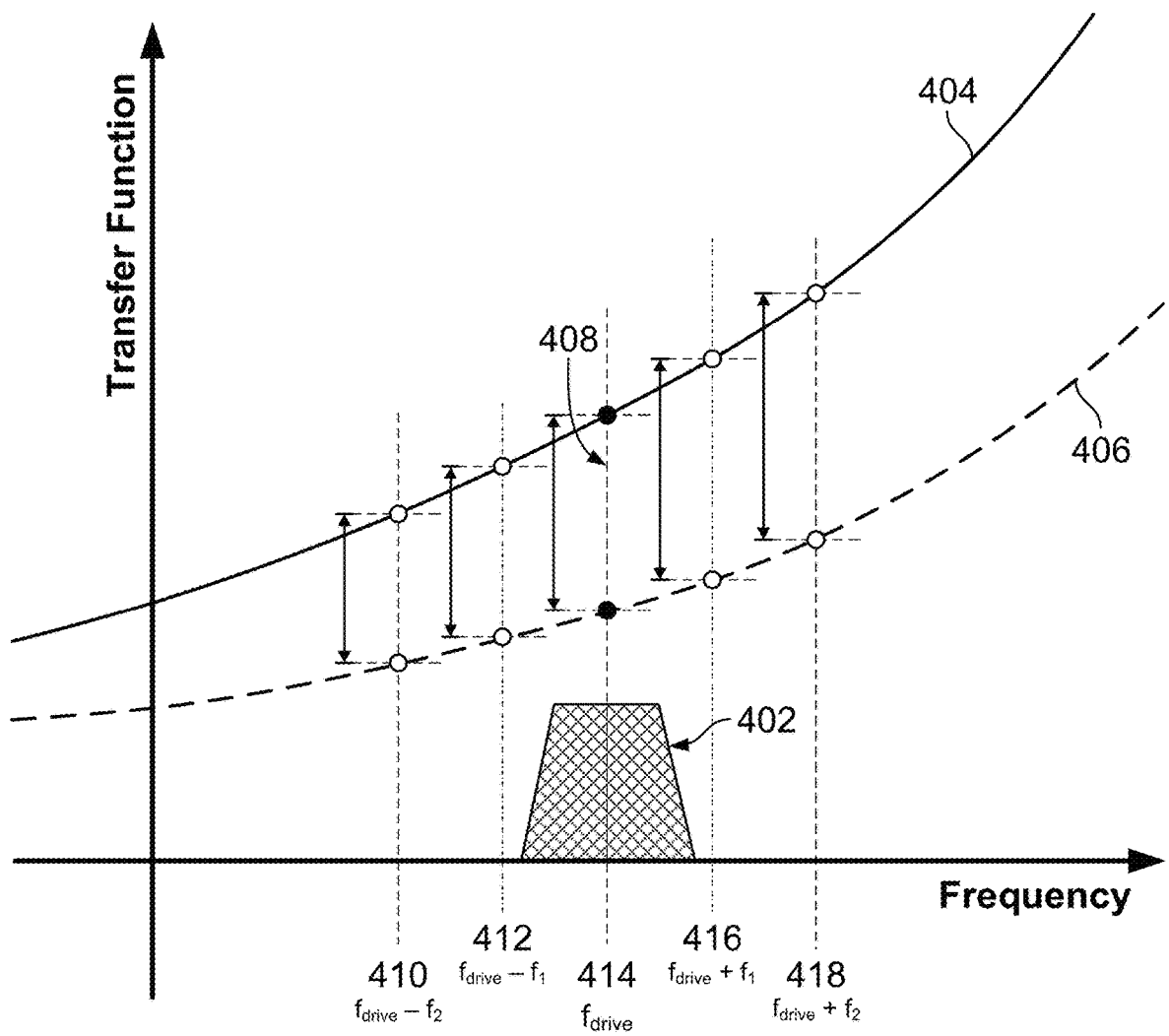
FIG. 4 shows a diagram depicting a sense transfer function of a MEMS before demodulation in accordance with an embodiment of the present disclosure, and its possible variations in two different instants of the sensor life.

FIG. 4 shows a diagram depicting a sense transfer function of a MEMS (e.g., MEMS gyroscope 310, 102, and/or 200) before demodulation in accordance with an embodiment of the present disclosure, and possible variations of the sense transfer function as taken at two different instants of the sensor life (e.g., after factory setting and after being altered due to a stress applied to the MEMS device, such as from soldering the MEMS to a circuit board). FIG. 4 includes intended signal bandwidth 402, transfer function changed due to stress 404, transfer function at factory setting 406, transfer function variation 408, first tone frequencies 412, 416, second tone frequencies 410, 418, and drive frequency 414. In some embodiments, any number of sinusoidal tones, composing a test signal, may be injected into the MEMS to generate a sense transfer function provided that at least one tone is injected at a first frequency $f_1$, causing the test signal to generate a first spectral sample of the sense transfer function at $f_d-f_1$ and a second spectral sample to be generated at $f_d+f_1$, where $f_d$ is the drive frequency 414. In some embodiments, the first frequency $f_1$ may be any value that is convenient for the utility of the MEMS. It will be understood that drive frequency 414 may also be any value that is convenient for the utility of the MEMS. In an example, the first frequency $f_1$ is less than the drive frequency $f_d$. Although particular features are depicted in certain configurations for FIG. 4, it will be understood that features may be removed, modified, or substituted and that additional features may be added in certain embodiments.

Intended signal bandwidth 402 represents a frequency range of forces the MEMS is intended to sense (e.g., the Coriolis force). It will be understood that forces received via test and calibration electrodes may or may not be included in intended signal bandwidth 402. As depicted by FIG. 4, the test signal is a sum of two sinusoidal signals (e.g. Tone 1 at a first frequency $f_1$ and Tone 2 at a second frequency $f_2$). It will be understood that the injected tones may either be in-band or out-of-band with respect to the intended signal bandwidth 402. After the MEMS intrinsic modulation process, where in-phase (e.g., Coriolis) and quadrature components are respectively generated, 4 frequency samples (e.g., first tone frequencies 412, 416 and second tone frequencies 410, 418) of the sense transfer function are provided around drive frequency ($f_d$) 414. It will be understood that drive frequency 414 marks the center of the intended signal bandwidth 402 at which the MEMS is supposed to operate. First tone frequencies 412 (e.g., $f_d-f_1$), 416 (e.g., $f_d+f_1$) and second tone frequencies 410 (e.g., $f_d-f_2$), 418 (e.g., $f_d+f_2$) may be chosen outside the intended signal bandwidth 402 (e.g., where the MEMS is supposed to operate) in such a way that the test signal does not affect the normal operations of the MEMS. In some embodiments, the test signal may be injected in the MEMS at any arbitrary moment when the MEMS is operating normally. Transfer function changed due to stress 404 conveys a change in transfer function characteristic (e.g., phase, amplitude, etc.) during MEMS usage or lifecycle (e.g., due to temperature, bend, attrition of the MEMS, imprecise soldering, etc.). It will be understood that certain transfer function changes (e.g., temperature) are temporary while other changes (e.g., soldering, bending, usury, etc.) are often permanent. Transfer function at factory setting 406 represents a transfer function characteristic immediately after factory trimming, where processing circuitry of the MEMS determines and compensates for relevant variations of the sense transfer function (e.g., related to amplitude and phase) with respect to one or more test signals to generate a more precise sense transfer function. Transfer function variation 408 conveys the difference in values, at drive frequency ($f_d$) 414, of the transfer function changed due to stress 404 and the transfer function at factory setting 406 to show the amount of inaccuracy temporary stresses (e.g., temperature) and/or more permanent stresses (e.g., bend, usury, soldering, etc.) may impose on the MEMS. It will be understood that FIG. 4 is a general example and may be applied both to variations of the transfer function phase or to variations of the transfer function gain, namely the terms $\varphi_s$ ($f_d$) and $G_s$ ($f_d$) in equations (2), (3), (4), (5), (6), (7), (8), and (9) listed above. First tone frequencies 412, 416 represent a first sinusoidal tone injected into the MEMS (e.g., to create a modified proof mass sense signal), via test and calibration electrodes (e.g., self-test and/or quadrature electrodes), at a first frequency. Two spectral points are generated based on the first frequency (e.g., $f_d-f_1$ at 412 and $f_d+f_1$ at 416) and each of their corresponding values with the transfer function changed due to stress 404 and the transfer function at factory setting 406 are depicted in FIG. 4. Second tone frequencies 410, 418 represent a second sinusoidal tone injected into the MEMS (e.g., to create the modified proof mass sense signal), via test and calibration electrodes (e.g., self-test and/or quadrature electrodes), at a second frequency. Two spectral points are generated based on the second frequency (e.g., $f_d-f_2$ at 410 and $f_d+f_2$ at 418) and each of their corresponding values with the transfer function changed due to stress 404 and the transfer function at factory setting 406 are depicted in FIG. 4.

Figure 5:
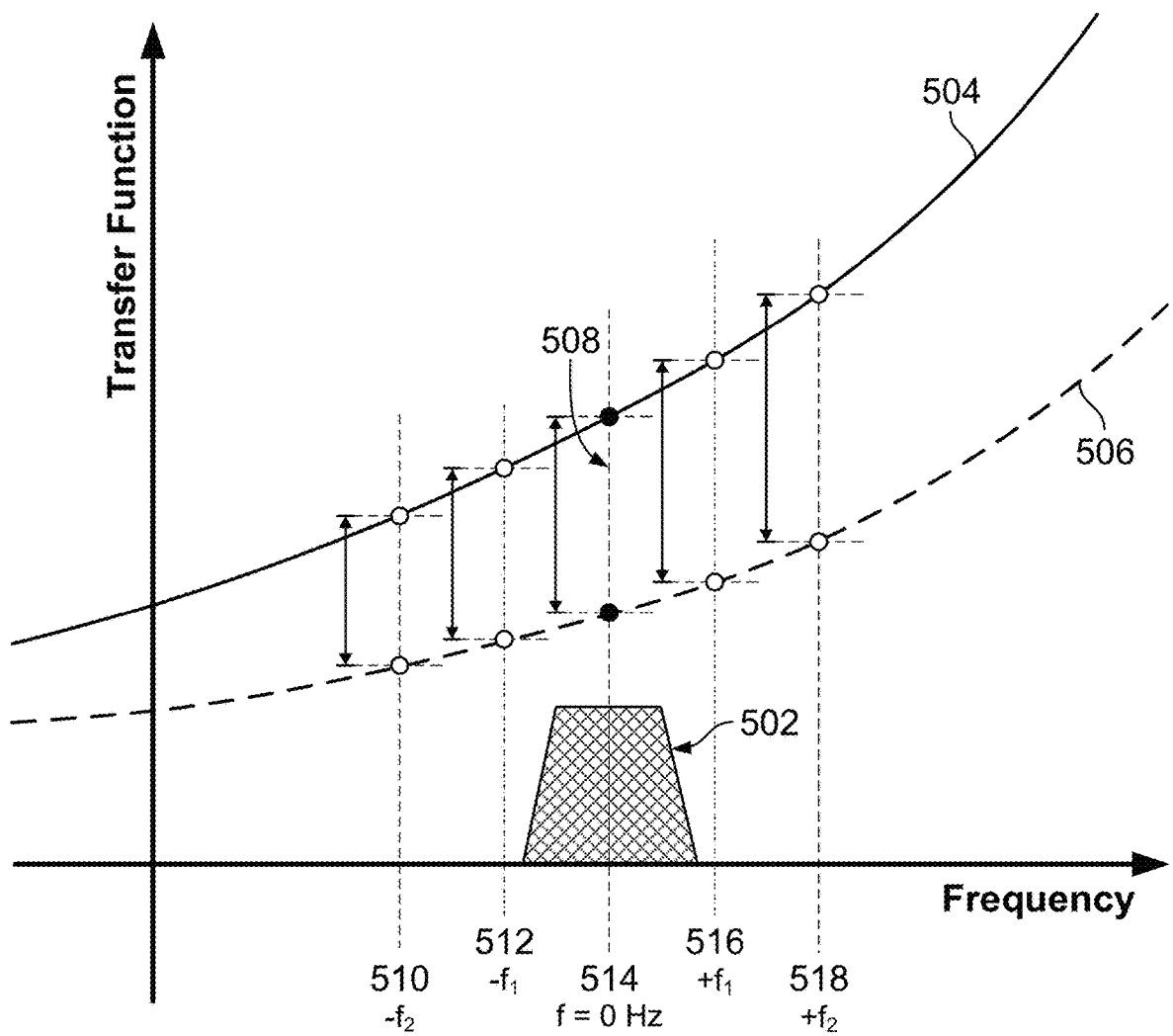
FIG. 5 shows a diagram depicting a sense transfer function of a MEMS after demodulation in accordance with an embodiment of the present disclosure, and its possible variations in two different instants of the sensor life.

FIG. 5 shows a diagram depicting a sense transfer function of a MEMS (e.g., MEMS gyroscope 310, 102, and/or 200) after demodulation in accordance with an embodiment of the present disclosure, and possible variations of the sense transfer function as taken at two different instants of the sensor life (e.g., after factory setting and after being altered due to a stress applied to the MEMS device, such as from soldering the MEMS to a circuit board). FIG. 5 includes transfer function changed due to stress 504 and transfer function at factory setting 506 after the demodulation process (i.e., shifted to the left by a quantity $f_d$) in addition to intended signal bandwidth 502 (corresponding to intended signal bandwidth 402 of FIG. 4), transfer function variation 508, first tone frequencies 512, 516, second tone frequencies 510, 518, and null frequency 514. In some embodiments, a test signal comprising, e.g., any number of sinusoidal tones, may be injected into the MEMS to generate a sense transfer function provided that at least one tone is injected at a first frequency $f_1$, causing, after demodulation, the test signal to generate a first spectral sample of the sense transfer function at $-f_1$ and a second spectral sample to be generated at $+f_1$. In some embodiments, the first frequency $f_1$ may be any value that is convenient for the utility of the MEMS. It will be understood that null frequency 514 is equal to 0 Hz. Although particular features are depicted in certain configurations for FIG. 5, it will be understood that features may be removed, modified, or substituted and that additional features may be added in certain embodiments.

Intended signal bandwidth 502 represents a frequency range of forces where the MEMS is intended to sense (e.g., the Coriolis force). It will be understood that forces received via test and calibration electrodes may or may not be included in intended signal bandwidth 502. The test signal is, in this example, a sum of two sinusoidal signals (e.g., Tone 1 at a first frequency $f_1$ and Tone 2 at a second frequency $f_2$), and FIG. 5 depicts the two sinusoidal signals in the frequency domain after demodulation has been performed by an in-phase and quadrature (I&Q) demodulator (e.g., demodulator 308). As a result, the frequency axis of FIG. 5 has been shifted to the left by a factor of the drive frequency, $f_d$, such that the transfer function variation 508 is evaluated at null frequency 514 (e.g., 0 Hz). It will be understood that the injected tones may either be in-band or out-of-band with respect to the intended signal bandwidth 502. After the demodulation process (e.g., an in-phase and quadrature (I&Q) demodulation process), 4 frequency samples (e.g., first tone frequencies 512, 516 and second tone frequencies 510, 518) of the sense transfer function are provided around null frequency 514, which marks the center of the intended signal bandwidth 502. First tone frequencies 512 (e.g., $-f_1$), 516 (e.g., $+f_1$) and second tone frequencies 510 (e.g., $-f_2$), 518 (e.g., $+f_2$) may be chosen outside the intended signal bandwidth 502 (e.g., where the MEMS is supposed to operate) in such a way that the test signal does not affect the normal operations of the MEMS. In some embodiments, the test signal may be injected in the MEMS at any arbitrary moment when the MEMS is operating normally. As described above, transfer function changed due to stress 404 conveys a change in transfer function characteristic (e.g., phase, amplitude, etc.) during MEMS usage or lifecycle (e.g., due to temperature, bend, attrition of the MEMS, imprecise soldering, etc.). It will be understood that certain transfer function changes (e.g., temperature) are temporary while other changes (e.g., soldering, bending, usury, etc.) are often permanent. As described above, transfer function at factory setting 406 represents a transfer function characteristic immediately after factory trimming, where processing circuitry of the MEMS determines and compensates for relevant variations of the sense transfer function (e.g., related to amplitude and phase) with respect to one or more test signals to generate a more precise sense transfer function. Transfer function variation 508 conveys the difference in values, at null frequency 514 (e.g., 0 Hz), of the transfer function changed due to stress 404 and the transfer function at factory setting 406 to show the amount of inaccuracy temporary stresses (e.g., temperature) and/or more permanent stresses (e.g., bend, usury, soldering, etc.) may impose on the MEMS. It will be understood that FIG. 5 is a general example and may be applied to both variations of the transfer function phase or to variations of the transfer function gain, namely the terms $\varphi_s(f_d)$ and $G_s(f_d)$ in equations (2), (3), (4), (5), (6), (7), (8), and (9) listed above. First tone frequencies 512, 516 represent a first sinusoidal tone injected into the MEMS, via self-test and/or quadrature electrodes, at a first frequency. Two spectral points are generated after demodulation based on the first frequency (e.g., at 512 and $+f_1$ at 516) and each of their corresponding values with the transfer function changed due to stress 404 and the transfer function at factory setting 406 are depicted in FIG. 5. Second tone frequencies 510, 518 represent a second sinusoidal tone injected into the MEMS, via self-test and/or quadrature electrodes, at a second frequency. Two spectral points are generated after demodulation based on the second frequency (e.g., $-f_2$ at 510 and $+f_2$ at 518) and each of their corresponding values with the transfer function changed due to stress 404 and the transfer function at factory setting 406 are depicted in FIG. 5.

In some embodiments, at I&Q demodulator (e.g., demodulator 308) output, it may be necessary to distinguish between positive and negative frequencies, in which case the I&Q demodulator provides complex signals to satisfy this embodiment. Otherwise, by using a real demodulator providing the in-phase channel only and not the quadrature channel, the negative and the positive frequencies would not be distinguishable from each other, such that after demodulation the information required for interpolation at 0 Hz would be lost. Positive and negative frequencies may be distinguished from each other because a positive frequency has a phasor (i.e., the complex number built by the real part, or "I" component, and the imaginary part, or the "Q" component) that rotates counter-clockwise, while a negative frequency has a phasor that rotates clockwise. If the Q component is not recovered, there is no way to distinguish among the positive and the negative frequencies. In some embodiments, as opposed to estimating the entire parameters of the sense transfer function, it may only be necessary to measure the sense transfer function variations in a few spectral points (e.g., the offset in values between the transfer function changed to stress 404 and the transfer function at factory setting 406 at spectral values 510, 512, 516, and 518) from a known status (e.g., the related values at factory trim vs their actual values), which may improve the precision of the estimations and/or compensation of the sense transfer function and reduce the complexity of the computation/hardware required in relevant digital signal processing. In some embodiments, untrimmed, non-fully compensated in-phase and quadrature components of an output signal (e.g., a proof mass output sense signal), as provided by equations (4) and (5) above, may be recovered to a trimmed form, as presented by equation 10 below by a matrix rotation:

$$\begin{bmatrix} \cos(\varphi_s(f_d)) & \sin(\varphi_s(f_d)) \\ -\sin(\varphi_s(f_d)) & \cos(\alpha_s(f_d)) \end{bmatrix} \quad (10)$$
$$\begin{bmatrix} G_s(f_d)\{\Omega(t) \cos(\varphi_s(f_d)) - Q_o \sin(\varphi_s(f_d))\} \\ G_s(f_d)\{\Omega(t) \sin(\varphi_s(f_d)) + Q_o \cos(\varphi_s(f_d))\} \end{bmatrix} = \begin{bmatrix} G_s(f_d)\Omega(t) \\ G_s(f_d)Q_o \end{bmatrix}$$

Any further compensation of the demodulation phase coming from stresses (e.g., temperature, bend, soldering, usury, etc.) the MEMS may be subjected to during its lifecycle may be performed after the I&Q demodulation process, fully digitally, by using digital rotation algorithms (e.g., a CORDIC—coordinate rotation digital computer). Digital rotation algorithms simplify processing circuitry architecture by avoiding complex mixed signal interaction between the digital signal processor and the phase-locked loop (PLL), enabling a fully digital phase compensation in a feed forward fashion.

Figure 6:
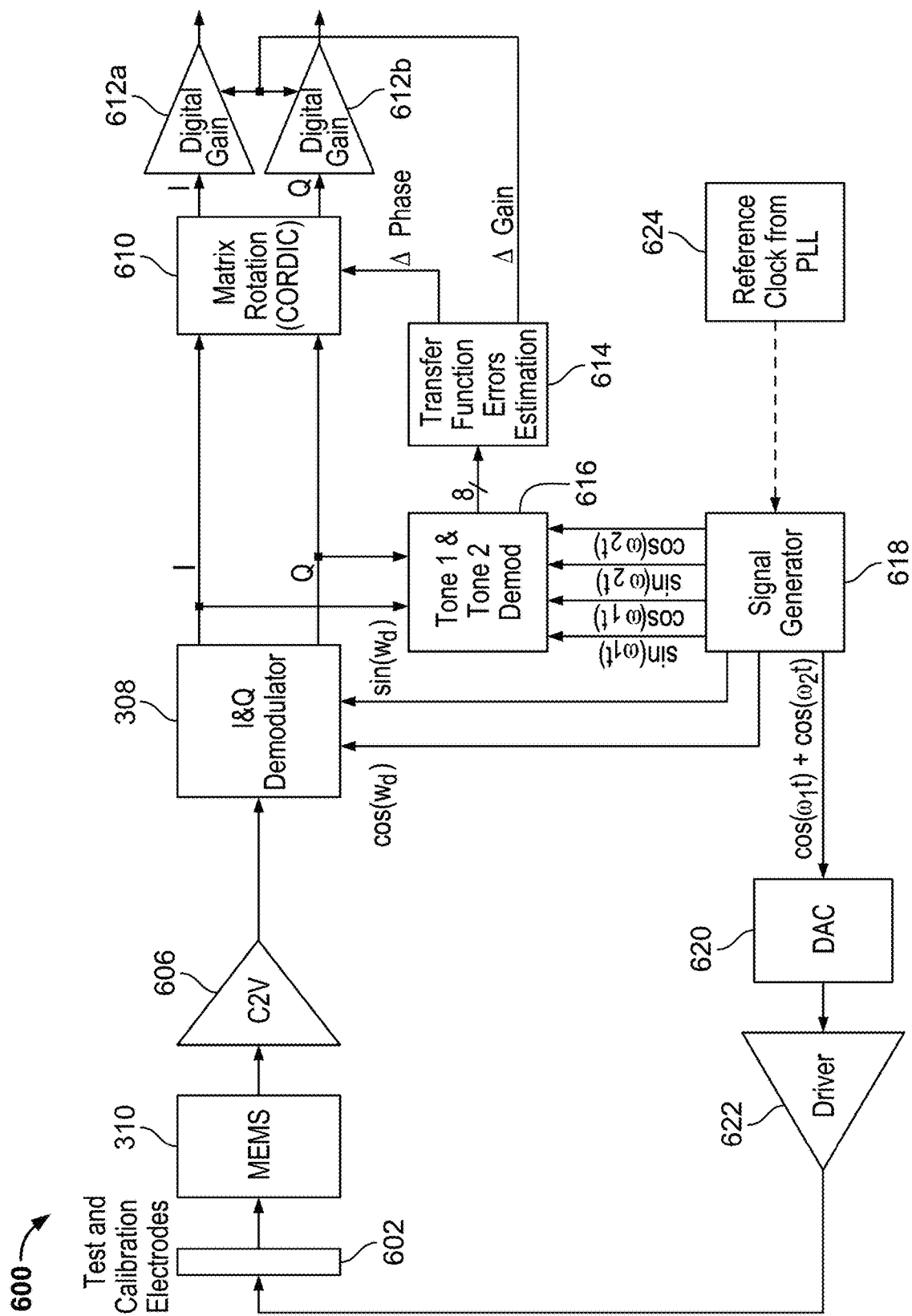
FIG. 6 shows an illustrative feed forward block diagram for estimating and compensating for sense transfer function variation in accordance with an embodiment of the present disclosure.

FIG. 6 shows an illustrative feed forward block diagram for estimating and compensating for sense transfer function variation in accordance with an embodiment of the present disclosure. In the depicted embodiment, system 600 includes test and calibration electrodes 602 (corresponding to self-test electrodes 322 and/or quadrature electrodes 318 of FIG. 3), MEMS gyroscope 310 and demodulator 308 of FIG. 3, capacitance-to-voltage (C2V) converter 606, matrix rotation 610, digital gain 612a, 612b, transfer function errors estimation 614, Tone 1 and Tone 2 demodulator 616, signal generator 618, digital-to-analog converter (DAC) 620, driver 622, and reference clock 624. It will be understood that any number of tones may be processed by system 600. Although particular components are depicted in certain configurations for system 600, it will be understood that components may be removed, modified, or substituted and that additional components (e.g., electrodes, converters, filters, etc.) may be added in certain embodiments.

Test and calibration electrodes 602 may receive an analog test signal (e.g., a voltage or a current, etc.) from driver 622, and may convert the test signal to either the in-phase (e.g., Coriolis) channel or the quadrature channel of MEMS gyroscope 310 to displace a proof mass internal to the MEMS gyroscope 310 and generate an output signal (e.g., a proof mass output sense signal). In some embodiments, injecting the test signal in the in-phase (e.g., Coriolis) channel results in in-phase (e.g., Coriolis) signals with a phase near 0° or −180° based on whether the drive resonant frequency is less than or greater than the sense resonant frequency. In some embodiments, injecting the test signal in the quadrature channel results in quadrature signals with a phase near −90° (e.g., mostly visible on the Quadrature channel). In some embodiments, injection of the test signal, via quadrature electrodes, may result in more accuracy (e.g., less phase and amplitude variation) as opposed to injection of the test signal via other types of calibration electrodes (e.g., self-test electrodes). It will be understood that test signals injected via the quadrature channel are less prone to jeopardize signals travelling along the in-phase (e.g., Coriolis) channel (e.g., the intended measurement channel). MEMS gyroscope 310 may include a suspended-spring mass system, a proof mass, the Coriolis (e.g., in-phase) channel (e.g., corresponding to an in-phase signal), the quadrature channel (e.g., corresponding to a quadrature signal), and proof mass sense electrodes for generating an output signal (e.g., a proof mass output sense signal) based on the displacement of the proof mass. In some embodiments, MEMS gyroscope 310 may be a variety of other sensors (e.g., an accelerometer, a barometer, an inertial measurement unit, a magnetometer, etc.). One or more test signals are injected into MEMS gyroscope 310, via test and calibration electrodes 602, to encode, via modulation, the in-phase signal and/or the quadrature signal and drive the proof mass such that the proof mass sense electrodes detect the displacement of the proof mass and generate an output signal (e.g., a proof mass output sense signal), which includes the in-phase signal and/or the quadrature signal. In some embodiments, MEMS gyroscope 310 may include processing circuitry that, e.g., is configured to receive the output signal (e.g., the proof mass output sense signal), via proof mass sense electrodes (e.g., moving capacitors), and generate additional signals (e.g., in-phase and quadrature displacement signals) from the output signal. Capacitance-to-voltage (C2V) converter 606 receives the output signal (e.g., the proof mass output sense signal) from MEMS gyroscope 310, specifically from proof mass sense electrodes acting as moving capacitors, converts the received capacitance signal to a voltage signal, and feeds the voltage signal to demodulator 308. The demodulator 308 extracts respective in-phase and quadrature components from the output signal. Additionally, demodulator 308 converts the in-phase and quadrature components from the analog to the digital domain. It will be understood that the order in which the demodulation and the analog-to-digital conversion are executed by demodulator 308 is not pertinent to the disclosure as described herein. It will be understood that demodulator 308 concurrently delivers the in-phase and quadrature components of the MEMS gyroscope 310 output signal to Tone 1 and Tone 2 demodulator 616 and matrix rotation 610. Demodulator 308 also receives reference signals (e.g., cos($\omega_d$) and sin($\omega_d$)) from signal generator 618 to serve as a baseline and contribute to identifying phase and/or gain offset when encoded with the in-phase (e.g., Coriolis) and quadrature components of the MEMS gyroscope 310 output signal.

Matrix rotation 610 (e.g., CORDIC—coordinate rotation digital computer) applies matrix rotation, as described by equation (10) above, to compensate for calculated phase error $\varphi_s(f_d)$ in accordance with phase estimation calculated by transfer function errors estimation 614. The application of the compensation value by matrix rotation 610 updates with the same timescale of the transfer function errors estimation 614. As a result, the processing circuitry of system 600 may be managed with a low-complexity hardware algorithm/unit working in a sequential fashion (e.g., using a CORDIC). Digital gain 612a, 612b respectively compensates for gain variation within the in-phase (e.g., Coriolis) component received at digital gain 612a and the quadrature component received at digital gain 612b. Specifically, digital gain 612a, 612b uses data from transfer function errors estimation 614 to compensate for the variation gain of the term $G_s(f_d)$ described in equation (10) above. Transfer function errors estimation 614 receives, e.g., 8 real numbers generated by Tone 1 and Tone 2 demodulator 616 and generates an estimation of phase and amplitude or of their variations. In some embodiments, this operation may include computational complexity since it involves complex calculations (e.g., inverse trigonometric function—arctangent, squaring and square root, interpolation, etc.). Transfer function errors estimation 614 is intended to track variations of the sense transfer function due to stresses (e.g., bend, usury, soldering, etc.) or temperature in the order of the temperature gradient. The update rate of these computations may typically be slow (e.g., on the order of few times per seconds, or slower). In some embodiments, these operations may be managed in a sequential way by using a middle-low complexity computation unit (e.g., a single arithmetic logic unit (ALU)). Once the demodulation of the entire test signal from the drive frequency, $f_d$, to the null frequency, 0 Hz, is executed, the test signal spectrum is similar to the diagram depicted in FIG. 4. To recover phase and amplitude information from the output signal (e.g., proof mass output sense signal) regarding the two test tones $f_1$ and $f_2$ after the demodulator 308, a further step of demodulation is implemented using the in-phase (e.g., Coriolis) and quadrature components related to $f_1$ and $f_2$ generated by signal generator 618. Tone 1 and Tone 2 demodulator 616 provides 4 complex signals, or equivalently 8 real signals, representing spectral samples of the sense transfer function $H_s$, e.g., $H_s(\omega_d-\omega_2)$, $H_s(\omega_d-\omega_1)$, $H_s(\omega_d+\omega_1)$, $H_s(\omega_d+\omega_2)$, to transfer function errors estimation 614. It will be also understood that, after demodulation, the sensor transfer function $H_s$ is shifted to the left by a quantity $f_d$, becoming the baseband sensor transfer function, thereinafter denoted by $H_{bb}$, such that the following equation (100) holds:

$$H_{bb}(2\pi f)=H_{bb}(\omega)=H_s(\omega-\omega_d)=H_s(2\pi[f-f_d]) \quad (100)$$

It will be also understood that, for Tone 1 and Tone 2 spectral samples, the following equations (101) hold:

$$H_s(\omega_d-\omega_2)=H_{bb}(-\omega_2)$$

$$H_s(\omega_d-\omega_1)=H_{bb}(-\omega_1)$$

$$H_s(\omega_d+\omega_1)=H_{bb}(+\omega_1)$$

$$H_s(\omega_d+\omega_2)=H_{bb}(+\omega_2)$$

$$H_s(\omega_d)=H_{bb}(0) \quad (101)$$

In some embodiments, Tone 1 and Tone 2 demodulator 616 may provide any number of complex signals, in accordance with signals received via signal generator 618 (e.g., sin($\omega_1$t), cos($\omega_1$t), sin($\omega_2$t), cos($\omega_2$t), where $\omega_1=2\pi f_1$ and ($\omega_2=2\pi f_2$), to transfer function errors estimation 614. By interpolation of these four complex values at transfer function errors estimation 614, or any other information derived thereof, the value of the sense transfer function at the drive frequency, fd, may be estimated, e.g., $H_s(\omega_d)$, and from the sense transfer function the variation of the phase and/or gain of $H_s(\omega_d)$ may be estimated, where $\omega_d=2\pi f_d$.

Signal generator 618 is fed by a phase-locked loop (PLL) and serves to generate the test signal (e.g., cos($\omega_1$t)+cos ($\omega_2$t), where $\omega_1=2\pi f_1$ and $\omega_2=2\pi f_2$), which is received by digital-to-analog converter (DAC) 620. It'll be understood that signal generator 618 generates the low frequency signals needed to recover the relevant phase and amplitude information (e.g., cos($2\pi f_1$t), cos($2\pi f_2$t), sin($2\pi f_1$t), and sin ($2\pi f_2$t)) after the demodulation process. Signal generator 618 may also generate reference signals (e.g., cos($\omega_d$t) and sin($\omega_d$t), where $\omega_d=2\pi f_d$) necessary for demodulator 308 to encode with the in-phase (e.g., Coriolis) and quadrature components of the MEMS gyroscope 310 output signal (e.g., proof mass output sense signal). DAC 620 converts the received test signal from the digital domain to the analog domain and feeds the analog converted test signal to driver 622 (e.g., a digital driver), which amplifies the test signal for driving the test and calibration electrodes 602. In some embodiments, the noise added to the test signal by DAC 620 and driver 622, the accuracy of the digital-to-analog conversion of the test signal by DAC 620, and the delay DAC 620 and driver 622 impose on the path of injection into the MEMS gyroscope 310 may be significant due to any error, delay, or inaccuracy introduced on top of the test signal being reflected in a related inaccuracy in the estimation of sense transfer function coefficients $\{b_k\}$ and $\{c_k\}$, as described by equations (11) through (18) below. Accordingly, DAC 620 and driver 622 provide high linearity and low delay, or at least a delay stable over temperature and with the device lifecycle stresses (e.g., bend, soldering, attrition, etc.). In some embodiments, a solution based on the digital drivers may be beneficial for the objectives of the disclosure described herein, which may include a sigma delta (SD) or a pulse-width modulated (PWM) DAC that enables the use of low delay/low noise digital drivers for which stability over a variety of temperatures and linearity is generally better than an analog drive or conversion architecture. Reference clock 624 drives the PLL, which then drives the clock distribution of system 600. The clock distribution is balanced such that the clock arrives at every endpoint simultaneously, including the PLL's feedback input.

Figure 7:
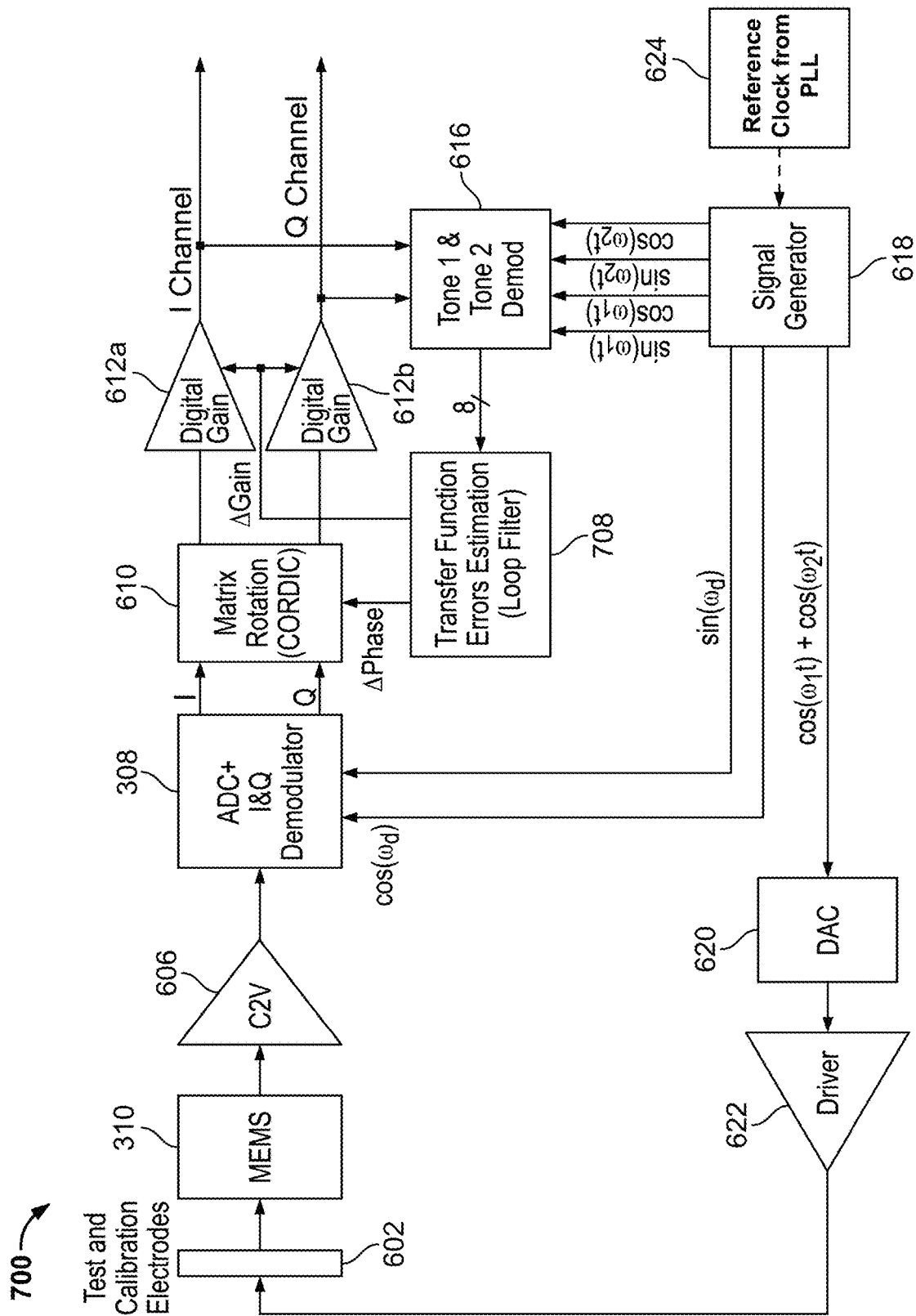
FIG. 7 shows an illustrative feedback block diagram for estimating and compensating for sense transfer function variation in accordance with an embodiment of the present disclosure.

FIG. 7 shows an illustrative feedback block diagram for estimating and compensating for sense transfer function variation in accordance with an embodiment of the present disclosure. In the depicted embodiment, system 700 includes test and calibration electrodes 602 (corresponding to self-test electrodes 322 and/or quadrature electrodes 318 of FIG. 3), MEMS gyroscope 310 and demodulator 308 of FIG. 3, capacitance-to-voltage (C2V) converter 606, matrix rotation 610, digital gain 612a, 612b, Tone 1 and Tone 2 demodulator 616, signal generator 618, digital-to-analog converter (DAC) 620, driver 622, and reference clock 624 from system 600. In addition, system 700 includes transfer function errors estimation 708 (e.g., a loop filter). It will be understood that any number of injected tones may be processed by system 700. Although particular components are depicted in certain configurations for system 700, it will be understood that components may be removed, modified, or substituted and that additional components (e.g., electrodes, converters, filters, etc.) may be added in certain embodiments.

The feedback block diagram of FIG. 7 depicts ADC/I&Q demodulator 308 receiving a voltage signal (e.g., an output signal of MEMS gyroscope 310) from C2V converter 606, where ADC/I&Q demodulator 308 converts the received voltage signal from the analog domain to the digital domain and proceeds to extract respective in-phase (e.g., Coriolis) and quadrature components from the voltage signal. It will be understood that the demodulation and the analog-to-digital conversion may be executed in any order that is convenient. It will be understood that ADC (analog-to-digital converter)/I&Q demodulator 308 receives reference signals (e.g., $\cos(\omega_d)$ and $\sin(\omega_d)$) from signal generator 618 to serve as a baseline and contribute to identifying phase and/or gain variation when encoded with the in-phase (e.g., Coriolis) and quadrature components of the MEMS gyroscope 310 output signal. ADC/I&Q demodulator 308 feeds the in-phase component and the quadrature component of the MEMS gyroscope 310 output signal (e.g., proof mass output sense signal) to matrix rotation 610 (e.g., CORDIC—coordinate rotation digital computer), which applies matrix rotation, as described by equation (10) above, to compensate for calculated phase error $\varphi_s(f_d)$ in accordance with phase estimation calculated by transfer function errors estimation 708. The application of the compensation value by matrix rotation 610 updates with the same timescale of the transfer function errors estimation 708. As a result, the processing circuitry of system 700 may be managed with a low-complexity hardware algorithm/unit working in a sequential fashion (e.g., using a CORDIC). Digital gain 612a, 612b respectively compensates for gain variation within the in-phase (e.g., Coriolis) component received at digital gain 612a and the quadrature component received at digital gain 612b. Specifically, digital gain 612a, 612b uses data from transfer function errors estimation 708 to compensate for the variation gain of the term $G_s(f_d)$ described in equation (10) above. As opposed to system 600, where Tone 1 and Tone 2 demodulator 616 receives the in-phase and quadrature components of the MEMS gyroscope 310 output signal from demodulator 308 (e.g., including phase and gain variation), in system 700, Tone 1 and Tone 2 demodulator 616 receives the in-phase and quadrature components from digital gain 612a, 612b (e.g., after being compensated for both phase and gain variation). Once the demodulation of the entire test signal from the drive frequency, $f_d$, to the null frequency, 0 Hz, is executed, the test signal spectrum is similar to the diagram depicted in FIG. 5. To recover phase and amplitude information from the output signal (e.g., proof mass output sense signal) regarding the two test tones $f_1$ and $f_2$ after the ADC/I&Q demodulator 308, a further step of demodulation is implemented using the in-phase (e.g., Coriolis) and quadrature components related to $f_1$ and $f_2$ generated by signal generator 618. Tone 1 and Tone 2 demodulator 616 provides 4 complex signals, or equivalently 8 real signals, e.g., $H_s(\omega_d-\omega_2)$, $H_s(\omega_d-\omega_1)$, $H_s(\omega_d+\omega_1)$, $H_s(\omega_d+\omega_2)$, to transfer function errors estimation 708. In some embodiments, Tone 1 and Tone 2 demodulator 616 may provide any number of complex signals, in accordance with signals received via signal generator 618 (e.g., $\sin(\omega_1 t)$, $\cos(\omega_1 t)$, $\sin(\omega_2 t)$, $\cos(\omega_2 t)$, where $\omega_1=2\pi f_1$ and $\omega_2=2\pi f_2$), to transfer function errors estimation 708. By interpolation of these four complex values at transfer function errors estimation 708 (e.g., loop filter), or any other information derived thereof, the value of the sense transfer function at the drive frequency, $f_d$, may be estimated, e.g., $H_s(f_d)$, and from the sense transfer function the variation of the phase and/or gain of $H_s(f_d)$ may be estimated. In order to implement the Loop Filter 708, the gain and phase may be calculated, then the error of gain and phase with respect to some reference values (e.g., the related values at factory trim) may be processed by means of a PID (Proportional-Integral-Derivative) controller, such to get the correct values of the gain and phase that null the errors.

Figure 8:
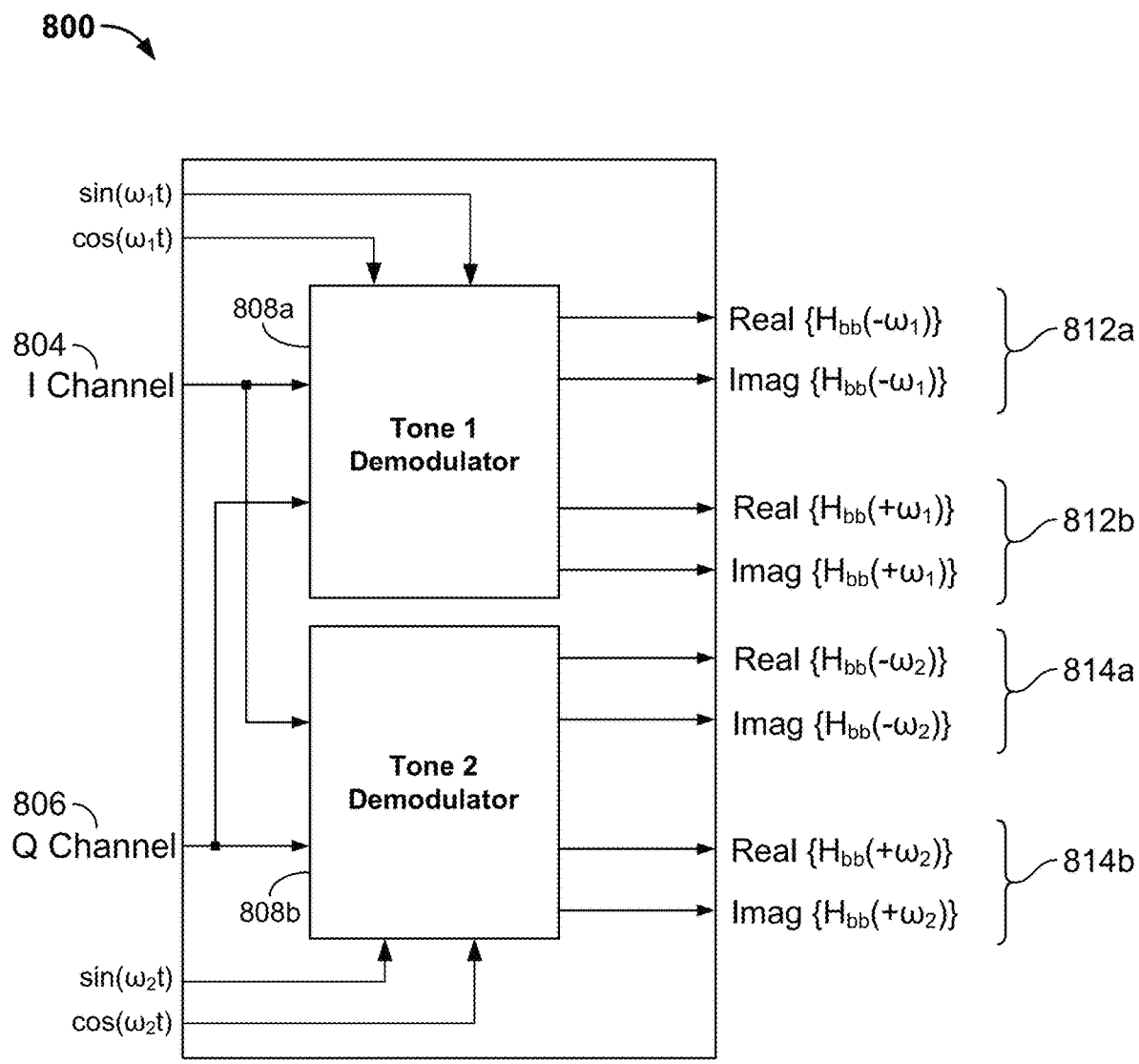
FIG. 8 shows an illustrative block diagram of a multi-tone demodulator in accordance with an embodiment of the present disclosure.

FIG. 8 shows an illustrative block diagram of a multi-tones demodulator in accordance with an embodiment of the present disclosure. Tones demodulator 800 (e.g., a multiple test signal demodulator) includes in-phase channel 804, quadrature channel 806, Tone 1 demodulator 808a, Tone 2 demodulator 808b, Tone 1 transfer function coefficients 812a, 812b, and Tone 2 transfer function coefficients 814a, 814b. In some embodiments, tones demodulator 800 may receive more than two tones to process and generate sense transfer function coefficients (e.g., spectral points). Although particular components are depicted in certain configurations for tones demodulator 800, it will be understood that components may be removed, modified, or substituted and that additional components may be added in certain embodiments.

Tones demodulator 800 (e.g., a test signal demodulator) calculates the transfer function coefficients (e.g., the spectral points) for a MEMS sense transfer function, based on an injected test signal (e.g., a first tone with a first frequency, $f_1$, and a second tone with a second frequency, $f_2$), at Tone 1 demodulator 808*a* and Tone 2 demodulator 808*b* respectively. Tone demodulator 800 corresponds with Tone 1 & Tone 2 Demodulator 616 in FIG. 6 and with Tone 1 & Tone 2 Demodulator 616 in FIG. 7. In-phase channel 804 feeds an in-phase (e.g., Coriolis) component from an external I&Q demodulator to Tone 1 demodulator 808*a* and Tone 2 demodulator 808*b*, while quadrature channel 806 feeds a quadrature component from the external I&Q demodulator to Tone 2 demodulator 808*b* and Tone 1 demodulator 808*a*. In some embodiments, as depicted by FIG. 7, tones demodulator 800 may receive in-phase and quadrature components from digital gain outputs. Tone 1 demodulator 808*a*, including a first internal I&Q demodulator, uses the first tone with the first frequency, $f_1$, as a demodulation frequency and executes integration and downsampling during a suitable time window in accordance with the fastest velocity of variation of the sense transfer function that the tones demodulator 800 is intended to track. Tone 2 demodulator 808*b*, including a second internal I&Q demodulator, uses the second tone with the second frequency, $f_2$, as a demodulation frequency and executes integration and downsampling during a suitable time window in accordance with the fastest velocity of variation of the sense transfer function that the tones demodulator 800 is intended to track. Tones demodulator 800 outputs, via Tone 1 demodulator 808*a*, 2 complex values, or equivalently 4 real values, in the form of Tone 1 transfer function coefficients 812*a*, 812*b*. In addition, Tones demodulator 800 outputs, via Tone 2 demodulator 808*b*, 2 complex values, or equivalently 4 real values, in the form of Tone 2 transfer function coefficients 814*a*, 814*b*. Tones demodulator 800 feeds Tone 1 transfer function coefficients 812*a*, 812*b* and Tone 2 transfer function coefficients 814*a*, 814*b* to a transfer function errors estimation component, which uses the received spectral values to estimate a sense transfer function, e.g., $H_s(\omega_d)$ and from the sense transfer function the variation of the phase and/or gain of $H_s(\omega_d)$ may be estimated.

Figure 9:
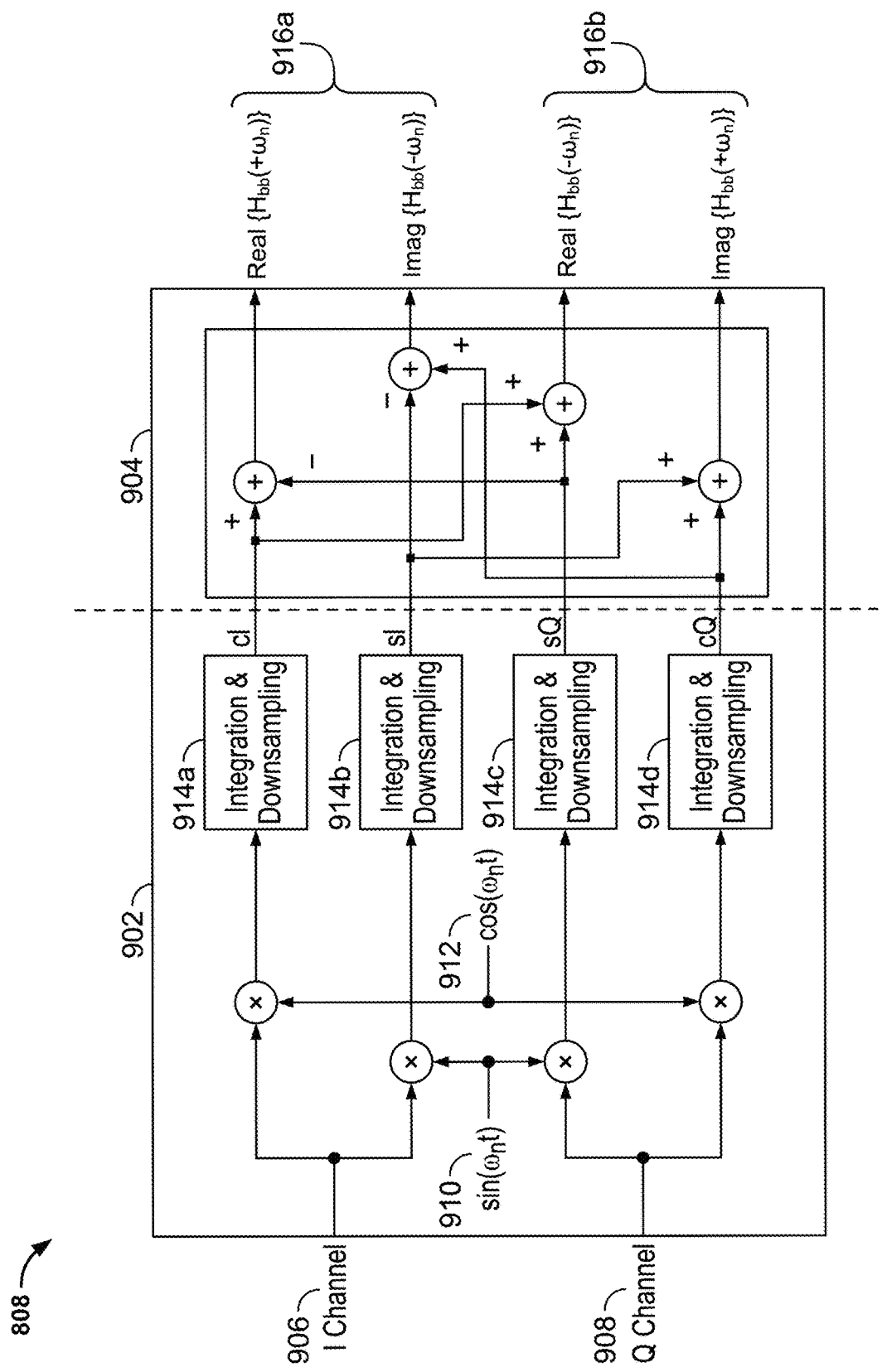
FIG. 9 shows an illustrative block diagram of a single tone demodulator in accordance with an embodiment of the present disclosure.

FIG. 9 shows an illustrative block diagram of a single tone demodulator in accordance with an embodiment of the present disclosure. Single tone demodulator 808 (e.g., a single test signal demodulator) includes high frequency signal processing 902, low frequency signal processing 904, in-phase channel 906, quadrature channel 908, sine component 910, cosine component 912, integration and downsampling 914*a*-914*d*, and transfer function coefficients 916*a*, 916*b*. Although particular components are depicted in certain configurations for single tone demodulator 808, it will be understood that components may be removed, modified, or substituted and that additional components may be added in certain embodiments.

In-phase channel 906 travels from an external I&Q demodulator (e.g., demodulator 308) to single tone demodulator 808 carrying an in-phase (e.g., Coriolis) signal, which includes sine component 910 (e.g., $\sin(\omega_n t)$) and cosine component 912 (e.g., $\cos(\omega_n t)$), and quadrature channel 908 travels from the I&Q demodulator to single tone demodulator 808 carrying a quadrature signal, which also includes sine component 910 (e.g., $\sin(\omega_n t)$) and cosine component 912 (e.g., $\cos(\omega_n t)$). In some embodiments, as depicted by FIG. 7, single tone demodulator 808 may receive in-phase and quadrature components from digital gain outputs. In some embodiments, single tone demodulator 808 may either process a first tone with a first frequency, $f_1$ as demodulation frequency or a second tone with a second frequency, $f_2$, as demodulation frequency such that single tone demodulator 808 actuates integration and downsampling 914*a*-914*d* on a suitable time window in accordance with the fastest velocity of variation of a sense transfer function that the single tone demodulator 808 is intended to track. It will be understood that single tone demodulator 808 calculates transfer function coefficients 916*a*, 916*b* (e.g., spectral points) based on either the first tone with the first frequency, $f_1$, or the second tone with the second frequency, $f_2$. In some embodiments, the velocity of variation is dictated by a temperature gradient specified for the single tone demodulator 808 and may be in a range of some degrees (e.g., Kelvin) per minute. Accordingly, the integration and downsampling 914*a*-914*d* may be in the order of seconds or very few Hz. It will be understood that high frequency signal processing 902 includes the mixing of the sine component 910 (e.g., $\sin(\omega_n t)$) and the cosine component 912 (e.g., $\cos(\omega_n t)$) with the in-phase (e.g., Coriolis) signal, fed by the in-phase channel 906 to integration and downsampling 914*a*, 914*b*, and the quadrature signal, fed by the quadrature channel 908 to integration and downsampling 914*c*, 914*d*, providing demodulation of both the in-phase (e.g., Coriolis) signal and the quadrature signal. High frequency signal processing 902 additionally includes integration and downsampling 914*a*-914*d*, which, e.g., may integrate and downsample received in-phase (e.g., Coriolis) and quadrature signals based on a first frequency, $f_1$, or a second frequency, $f_2$, with the velocity of variation of the sense transfer function. Low frequency signal processing 904 receives the outputs of integration and downsampling 914*a*-914*d* and processes the respective in-phase (e.g., Coriolis) and quadrature components, via an inverse trigonometric function (e.g., arctangent) and third order interpolation, to estimate phase. In addition, low frequency signal processing 904 estimates gain by computing a square root of a sum of squares and a third order interpolation of the received in-phase (e.g., Coriolis) and quadrature signals. Single tone demodulator 808 outputs, via low frequency signal processing 904, transfer function coefficients 916*a*, 916*b*, which include 2 complex values, or equivalently 4 real values, to a transfer function errors estimation component that uses the received spectral values to estimate the sense transfer function, e.g., $H_s(2\pi f_d)$ and any phase and/or gain variation associated with $H_s(2\pi f_d)$.

Figure 10:
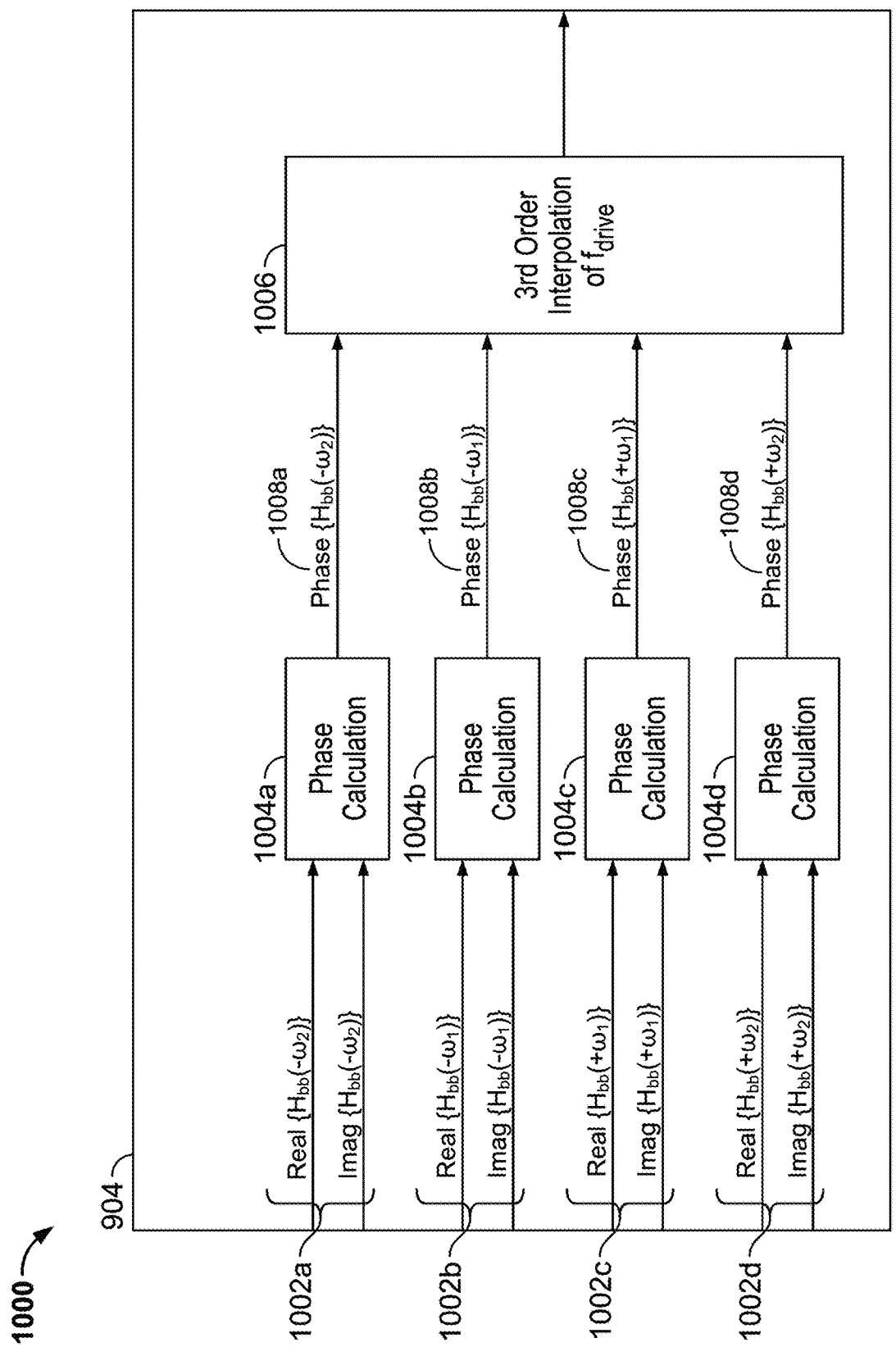
FIG. 10 shows an illustrative block diagram of phase estimation in accordance with an embodiment of the present disclosure.

FIG. 10 shows an illustrative block diagram of phase estimation in accordance with an embodiment of the present disclosure. Phase estimation 1000 includes low frequency signal processing 904, transfer function coefficients 1002*a*-1002*d*, phase calculation 1004*a*-1004*d*, phases 1008*a*-1008*d*, and third order interpolation 1006. It will be understood that phase estimation 1000 may receive transfer function coefficients (e.g., spectral points) driven by any number of tones having a commensurate number of frequencies. Although particular components are depicted in certain configurations for phase estimation 1000, it will be understood that components may be removed, modified, or substituted and that additional components may be added in certain embodiments.

Phase estimation 1000 partially composes low frequency signal processing 904, which receives transfer function coefficients 1002*a*-1002*d*, e.g., 4 spectral points $H_s(\omega_d-\omega_2)$, $H_s(\omega_d-\omega_1)$, $H_s(\omega_d+\omega_1)$, $H_s(\omega_d+\omega_2)$, or equivalently, according to equation (100) and (101), $H_{bb}(-\omega_2)$, $H_{bb}(-\omega_1)$, $H_{bb}(+\omega_1)$, $H_{bb}(+\omega_2)$, based on either a first tone with a first frequency, f1, or a second tone with a second frequency, $f_2$, from high frequency signal processing. Transfer function coefficients 1002*a*-1002*d* include 4 complex values (e.g., real $\{H_{bb}(-\omega_2)\}$, imaginary $\{H_{bb}(-\omega_2)\}$ 1002*a*, real $\{H_{bb}(-\omega_1)\}$, imaginary $\{H_{bb}(-\omega_1)\}$ 1002*b*, real $\{H_{bb}(+\omega_1)\}$, imaginary $\{H_{bb}(+\omega_1)\}$ 1002*c*, and real $\{H_{bb}(+\omega_2)\}$, imaginary $\{H_{bb}(+\omega_2)\}$ 1002*d*), or equivalently 8 real values. Low frequency signal processing 904 estimates phase 1008a-1008d by receiving each of transfer function coefficients 1002a-1002d and performing a phase calculation 1004a-1004d (e.g., with an inverse trigonometric function—arctangent). Third order interpolation 1006 of drive frequency, $f_d$, receives each of phases 1008a-1008d and calculates a missing phase complex value, e.g., in the middle of the received spectral points, e.g., $\varphi_s(f_d)$—phase error. It will be understood that third order interpolation 1006 determines 4 coefficients, as depicted by equations (11) below:

$$\mathrm{Arg}\{H_s(2\pi[f_d-f_2])\}=c_0+c_1(f_d-f_2)+c_2(f_d-f_2)^2+c_3(f_d-f_2)^3$$

$$\mathrm{Arg}\{H_s(2\pi[f_d-f_1])\}=c_0+c_1(f_d-f_1)+c_2(f_d-f_1)^2+c_3(f_d-f_1)^3$$

$$\mathrm{Arg}\{H_s(2\pi[f_d+f_1])\}=c_0+c_1(f_d+f_1)+c_2(f_d+f_1)^2+c_3(f_d+f_1)^3$$

$$\mathrm{Arg}\{H_s(2\pi[f_d+f_2])\}=c_0+c_1(f_d+f_2)+c_2(f_d+f_2)^2+c_3(f_d+f_2)^3$$

Once third order interpolation 1006 solves the system depicted by equations (11), the phase error at $f_d$ is determined as:

$$\mathrm{Arg}\{H_s(2\pi f_d)\}=\varphi_s(f_d)=c_0+c_1(f_d)+c_2(f_d)^2+c_3(f_d)^3 \quad (12)$$

It will be understood that this formula applies not only to $f_d$, but to any other frequency comprised within $[f_d-f_2]$ and $[f_d+f_2]$.

It will be understood that low frequency signal processing 904 may receive and process any number of transfer function coefficients. In some embodiments, phase estimation 1000 is not required to calculate the entire spectrum of transfer function coefficients, but only their variations with respect to the injected test signal, e.g., including the first tone of the first frequency, $f_1$, and the second tone of the second frequency, $f_2$. To track the relevant phase variations (e.g., due to bend, soldering, attrition, temperature, etc.) occurring during the lifecycle of the MEMS, equations (11) above may be modified as follows, where $H_{so}(f_d)$ denotes the sense transfer function after factory trimming:

$$\mathrm{Arg}\{H_{so}(2\pi[f_d-f_2])\}-\mathrm{Arg}\{H_s(2\pi[f_d-f_2])\}=c_0+c_1(f_d-f_2)+c_2(f_d-f_2)^2+c_3(f_d-f_2)^3$$

$$\mathrm{Arg}\{H_{so}(2\pi[f_d-f_1])\}-\mathrm{Arg}\{H_s(2\pi[f_d-f_1])\}=c_0+c_1(f_d-f_1)+c_2(f_d-f_1)^2+c_3(f_d-f_1)^3$$

$$\mathrm{Arg}\{H_{so}(2\pi[f_d+f_1])\}-\mathrm{Arg}\{H_s(2\pi[f_d+f_1])\}=c_0+c_1(f_d+f_1)+c_2(f_d+f_1)^2+c_3(f_d+f_1)^3$$

$$\mathrm{Arg}\{H_{so}(2\pi[f_d+f_2])\}-\mathrm{Arg}\{H_s(2\pi[f_d+f_2])\}=c_0+c_1(f_d+f_2)+c_2(f_d+f_2)^2+c_3(f_d+f_2)^3 \quad (13)$$

Once third order interpolation 1006 solves the system depicted by equations (13), the phase error at $f_d$ is determined as:

$$\mathrm{Arg}\{H_{so}(2\pi f_d)\}-\mathrm{Arg}\{H_s(2\pi f_d)\}=\Delta\varphi_s(f_d)=c_0+c_1(f_d)+c_2(f_d)^2+c_3(f_d)^3 \quad (14)$$

$\Delta\varphi_s(f_d)$ represents the additional phase correction to be added to the phase factory trimming to compensate for additional phase impairments that may occur after factory trimming. The transfer function coefficients 1002a-1002d (e.g., spectral points) of the sense transfer function at factoring trimming, e.g., $H_s(\omega_d-\omega_2)$, $H_s(\omega_d-\omega_1)$, $H_s(\omega_d+\omega_1)$, $H_s(\omega_d+\omega_2)$, or any related information required by the method, may be stored in memory (e.g., one-time programmable (OTP) memory, flash memory, etc.) to be read and used when needed to calculate $\varphi_s(f_d)$ and $\Delta\varphi_s(f_d)$. It will be understood that equation (14) applies not only to $f_d$, but to any other frequency comprised within $[f_d-f_2]$ and $[f_d+f_2]$.

Figure 11:
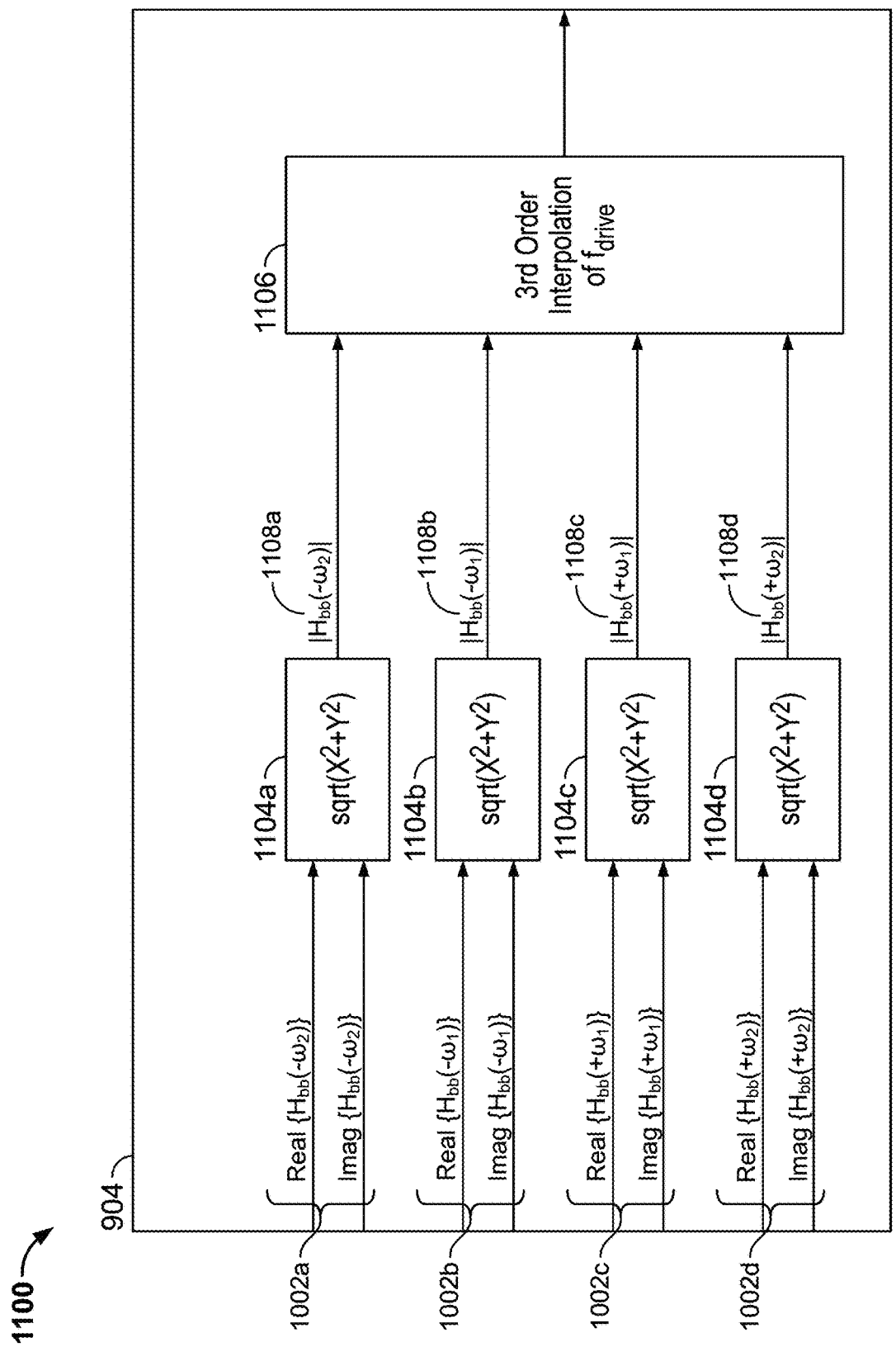
FIG. 11 shows an illustrative block diagram of amplitude estimation in accordance with an embodiment of the present disclosure.

FIG. 11 shows an illustrative block diagram of amplitude estimation in accordance with an embodiment of the present disclosure. Amplitude estimation 1100 includes low frequency signal processing 904, transfer function coefficients 1002a-1002d, amplitude calculations 1104a-1104d, amplitudes 1108a-1108d, and third order interpolation 1106. It will be understood that amplitude estimation 1100 may receive transfer function coefficients (e.g., spectral points) driven by any number of tones having a commensurate number of frequencies. Although particular components are depicted in certain configurations for amplitude estimation 1100, it will be understood that components may be removed, modified, or substituted and that additional components may be added in certain embodiments.

Amplitude estimation 1100 partially composes low frequency signal processing 904, which receives transfer function coefficients 1002a-1002d, e.g., 4 spectral points $H_s(\omega_d-\omega_2)$, $H_s(\omega_d-\omega_1)$, $H_s(\omega_d+\omega_1)$, $H_s(\omega_d+\omega_2)$, based on either a first tone with a first frequency, $f_1$, or a second tone with a second frequency, $f_2$, from high frequency signal processing. Transfer function coefficients 1002a-1002d include 4 complex values (e.g., real $\{H_{bb}(-\omega_2)\}$, imaginary $\{H_{bb}(-\omega_2)\}$ 1002a, real $\{H_{bb}(-\omega_1)\}$, imaginary $\{H_{bb}(-\omega_1)\}$ 1002b, real $\{H_{bb}(+\omega_1)\}$, imaginary $\{H_{bb}(+\omega_1)\}$ 1002c, and real $\{H_{bb}(+\omega_2)\}$, imaginary $\{H_{bb}(+\omega_2)\}$ 1002d), or equivalently 8 real values. Low frequency signal processing 904 estimates amplitude 1108a-1108d by receiving each of transfer function coefficients 1002a-1002d and performing an amplitude calculation 1104a-1104d, respectively (e.g., with a square root of a sum of squares). Third order interpolation 1106 of drive frequency, $f_d$, receives each of amplitudes 1108a-1108d and calculates a missing complex value in the middle of the received spectral points, e.g., $G_s(f_d)$—amplitude variation. It will be understood that third order interpolation 1106 determines 4 coefficients, as depicted by equations (15) below:

$$|H_s(2\pi[f_d-f_2])|=b_0+b_1(f_d-f_2)+b_2(f_d-f_2)^2+b_3(f_d-f_2)^3$$

$$|H_s(2\pi[f_d-f_1])|=b_0+b_1(f_d-f_1)+b_2(f_d-f_1)^2+b_3(f_d-f_1)^3$$

$$|H_s(2\pi[f_d+f_1])|=b_0+b_1(f_d+f_1)+b_2(f_d+f_1)^2+b_3(f_d+f_1)^3$$

$$|H_s(2\pi[f_d+f_2])|=b_0+b_1(f_d+f_2)+b_2(f_d+f_2)^2+b_3(f_d+f_2)^3 \quad (15)$$

Once third order interpolation 1106 solves the system depicted by equations (15), the amplitude variation at $f_d$ is determined as:

$$|H_s(2\pi f_d)|=G_s(F_d)=b_0+b_1(f_d)+b_2(f_d)^2+b_3(f_d)^3 \quad (16)$$

It will be understood that this formula applies not only to $f_d$, but to any other frequency comprised within $[f_d-f_2]$ and $[f_d+f_2]$.

In some embodiments, amplitude estimation 1100 is not required to calculate the entire spectrum of transfer function coefficients, but only their variations with respect to the injected test signal, e.g., including the first tone of the first frequency, $f_1$, and the second tone of the second frequency, $f_2$. To track the relevant amplitude variations (e.g., due to bend, soldering, attrition, temperature, etc.) occurring during the lifecycle of the MEMS, equations (15) above may be modified as follows, where $H_{so}(f_d)$ denotes the sense transfer function after factory trimming:

$$|H_{so}(2\pi[f_d-f_2])|-|H_s(2\pi[f_d-f_2])|=b_0+b_1(f_d-f_2)+b_2(f_d-f_2)^2+b_3(f_d-f_2)^3$$

$$|H_{so}(2\pi[f_d-f_1])|-|H_s(2\pi[f_d-f_1])|=b_0+b_1(f_d-f_1)+b_2(f_d-f_1)^2+b_3(f_d-f_1)^3$$

$$|H_{so}(2\pi[f_d+f_1])|-|H_s(2\pi[f_d+f_1])|=b_0+b_1(f_d+f_1)+b_2(f_d+f_1)^2+b_3(f_d+f_1)^3$$

$$|H_{s0}(2\pi[f_d+f_2])|-|H_s(2\pi[f_d+f_2])|=b_0+b_1(f_d+f_2)+b_2(f_d+f_2)^2+b_3(f_d+f_2)^3 \quad (17)$$

Once third order interpolation 1106 solves the system depicted by equations (17), the amplitude variation at $f_d$ is determined as:

$$|H_{s0}(2\pi f_d)|-|H_s(2\pi f_d)|=\Delta G_s(f_d)=b_0+b_1(f_d)+b_2(f_d)^2+b_3(f_d)^3 \quad (18)$$

$\Delta G_s(f_d)$ represents the additional gain correction to be added to the gain factory trimming to compensate for gain impairments that may occur after the factory trimming. The transfer function coefficients 1002a-1002d (e.g., spectral points) of the sense transfer function at factory trimming, e.g., $H_{s0}(\omega_d-\omega_2)$, $H_{s0}(\omega_d-\omega_1)$, $H_{s0}(\omega_d+\omega_1)$, $H_{s0}(\omega_d+\omega_2)$ or any related information required by the method, may be stored in memory (e.g., one-time programmable (OTP) memory, flash memory, etc.) to be read and used when needed to calculate $G_s(f_d)$ and $\Delta G_s(f_d)$. It will be understood that this equation (18) applies not only to $f_d$, but to any other frequency comprised within $[f_d-f_2]$ and $[f_d+f_2]$.

Figure 12:
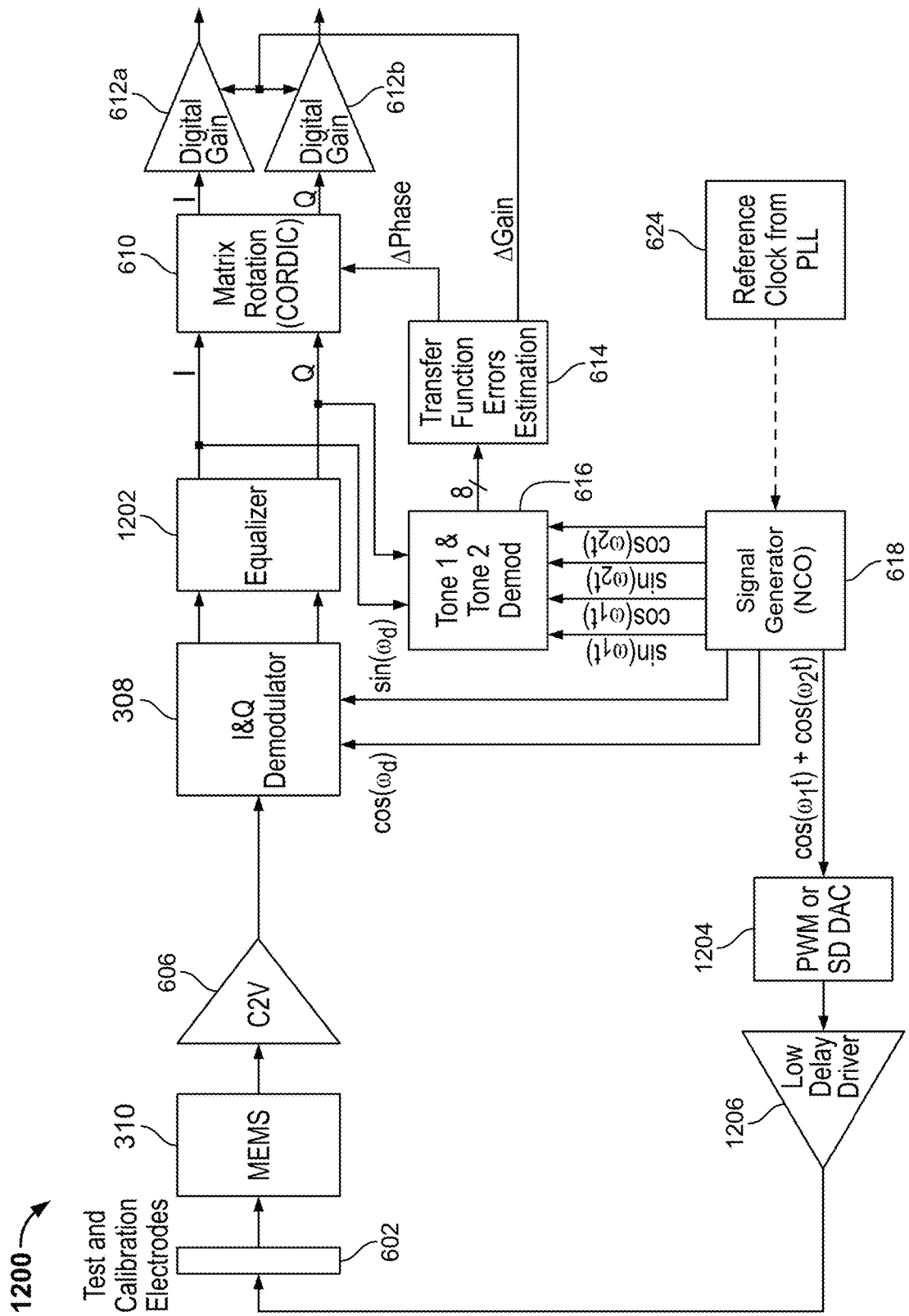
FIG. 12 shows an illustrative feed forward block diagram including an equalizer for estimating and compensating for sense transfer function variation in accordance with an embodiment of the present disclosure.

FIG. 12 shows an illustrative feed forward block diagram including an equalizer for estimating and compensating for sense transfer function variation in accordance with an embodiment of the present disclosure. In the depicted embodiment, system 1200 includes test and calibration electrodes 602 (corresponding to self-test electrodes 322 and/or quadrature electrodes 318 of FIG. 3), MEMS gyroscope 310 and demodulator 308 of FIG. 3, capacitance-to-voltage (C2V) converter 606, matrix rotation 610, digital gain 612a, 612b, transfer function errors estimation 614, Tone 1 and Tone 2 demodulator 616, signal generator 618, and reference clock 624 from system 600. In addition, system 1200 includes equalizer 1202, pulse-width modulated (PWM)/sigma delta (SD) digital-to-analog converter (DAC) 1204, and low delay driver 1206. It will be understood that any number of injected tones may be processed by system 1200. Although particular components are depicted in certain configurations for system 1200, it will be understood that components may be removed, modified, or substituted and that additional components (e.g., electrodes, converters, filters, etc.) may be added in certain embodiments.

Demodulator 308 extracts an in-phase (e.g., Coriolis) component and a quadrature component from a received voltage signal and converts the respective in-phase and quadrature (I&Q) components from the analog domain to the digital domain. It will be understood that the order in which the demodulation and the analog-to-digital conversion are executed by demodulator 308 is not limited in the disclosure described herein. Demodulator 308 also receives reference signals (e.g., $\cos(\omega_d)$ and $\sin(\omega_d)$) from signal generator 618 (e.g., a numerically-controlled oscillator) to serve as a baseline and contribute to provide reference signals for phase and/or gain offset when demodulating the in-phase and quadrature components of the MEMS gyroscope 310 output signal (e.g., proof mass output sense signal). Demodulator 308 feeds the in-phase and quadrature components to equalizer 1202, which flattens the gain and linearizes the phase of the in-phase and quadrature components and, as a result, makes the interpolation process (e.g., the third order interpolation of drive frequency, $f_d$, used for phase and amplitude estimation) simpler and more accurate. In some embodiments, equalizer 1202 may be implemented in a feedback architecture. In some embodiments, the frequency separation between the drive resonant frequency and the sense resonant frequency is small (e.g., near the test tone frequencies $f_1$ and $f_2$) such to cause a large phase variation of the sense transfer function near the frequency separation that may jeopardize the interpolation process. System 1200 further includes PWM/SD DAC 1204, which enables the use of low delay driver 1206 (e.g., a digital driver) for which stability over a variety of temperatures and linearity is generally better than an analog driver or conversion architecture.

Figure 13:
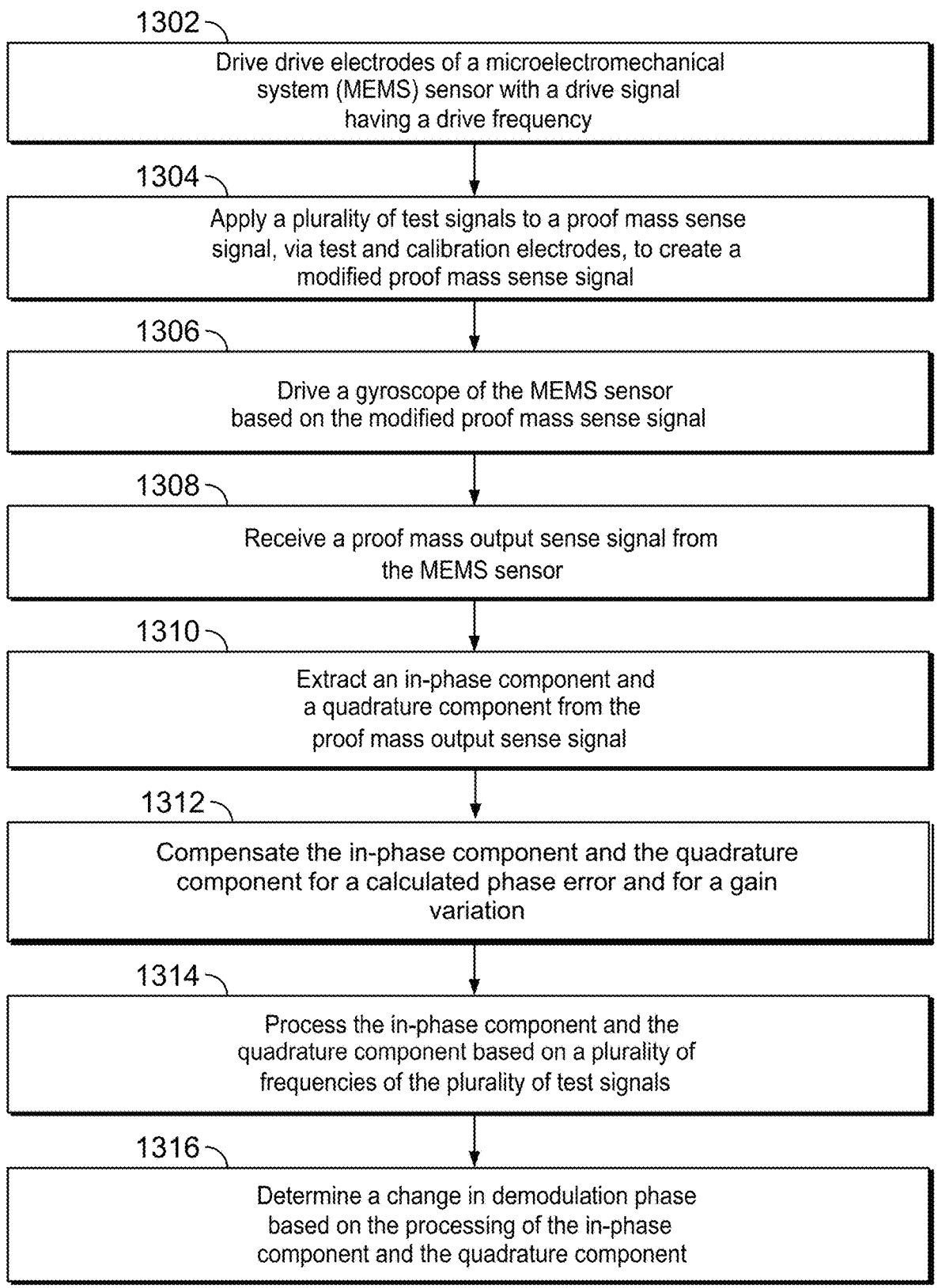
FIG. 13 shows an illustrative flowchart for reducing error in a MEMS device in accordance with an embodiment of the present disclosure.

FIG. 13 shows an illustrative flowchart for reducing error in a MEMS device (e.g., a MEMS gyroscope such as MEMS gyroscope 310, MEMS gyroscope 200, and/or MEMS gyroscope 102) in accordance with an embodiment of the present disclosure. Although particular steps are depicted in certain configurations for FIG. 13, it will be understood that steps may be removed, modified, or substituted and that additional steps may added in certain embodiments. At step 1302, processing circuitry (e.g., a control system including phase-locked loop (PLL) trim 302, PLL and Phase trim 304, and drive loop 306) drives drive electrodes (e.g., drive electrodes 316) of a microelectromechanical system (MEMS) sensor (e.g., MEMS gyroscope 310) with a drive signal having a drive frequency, fa. It will be understood that the drive signal displaces a drive mass (e.g., drive mass 326), which produces a drive sense signal that is detected by drive sense electrodes (e.g., drive sense electrodes 320). In some embodiments, a drive loop (e.g., drive loop 306) of the processing circuitry may shift the phase of the drive signal by any degree amount depending on an amount of offset the MEMS (e.g., MEMS gyroscope 310) experiences due to external stresses. In some embodiments, a PLL & Phase Trim (e.g., PLL & Phase Trim 304) of the processing circuitry may be synchronized with the oscillation frequency of the control system and produce a higher frequency clock at a multiple (e.g., a harmonic) of the drive frequency, $f_d$. At step 1304, processing circuitry applies (e.g., injects) a plurality of test signals to a proof mass sense signal, via test and calibration electrodes (e.g., quadrature electrodes and/or self-test electrodes 322), to create a modified proof mass sense signal. The plurality of test signals includes a quadrature component (e.g., quadrature signal 330), injected by quadrature electrodes (e.g., quadrature electrodes 318) or by self-test electrodes (e.g., self-test electrodes 322), which picks up design impairments based on temporary stresses (e.g., temperature) and/or permanent stresses (e.g., bend in the MEMS, stress after soldering, attrition and/or aging over the lifespan of the MEMS, etc.), and an in-phase (e.g., Coriolis) component (e.g., Coriolis signal 332), detected by self-test electrodes (e.g., self-test electrodes 322), which is the intended measurement component. In some embodiments, the plurality of test signals may include a first tone with a first frequency, $f_1$, and a second tone with a second frequency, $f_2$, among a plurality of frequencies. It will be understood that the plurality of test signals creates a modified proof mass sense signal by mixing, via modulation, with the proof mass sense signal. At step 1306, processing circuitry drives a gyroscope (e.g., proof mass 328) of the MEMS sensor (e.g., MEMS gyroscope 310) based on the modified proof mass sense signal, which displaces the gyroscope and generates, as described by step 1308, an output signal (e.g., a proof mass output sense signal), including in-phase (e.g., Coriolis) and quadrature components from the plurality of test signals, from the MEMS sensor. Sense electrodes (e.g., moving capacitors such as sense electrodes 324) detect the displacement of the proof mass (e.g., proof mass 328) with respect to the sense electrodes, generating a capacitive signal (e.g., the output signal), and feed the output signal (e.g., the proof mass output sense signal) to an in-phase and quadrature (I&Q) demodulator (e.g., demodulator 308).

At step 1310, processing circuitry, via the I&Q demodulator (e.g., demodulator 308), extracts an in-phase (e.g., Coriolis) component and a quadrature component from the output signal (e.g., proof mass output sense signal). In addition, the I&Q demodulator (e.g., demodulator 308) converts the in-phase component and the quadrature component from the analog domain to the digital domain. It will be understood that the order in which the demodulation and the analog-to-digital conversion are executed by the I&Q demodulator (e.g., demodulator 308) is not limited by the disclosure described herein. In some embodiments, the I&Q demodulator (e.g., demodulator 308) may receive reference signals (e.g., $\cos(\omega_d)$ and $\sin(\omega_d)$) from a signal generator (e.g., signal generator 618) to serve as a baseline and contribute to identifying phase and/or gain variation when encoded with the in-phase (e.g., Coriolis) and quadrature components of the MEMS (e.g., MEMS gyroscope 310) output signal (e.g., proof mass output sense signal). In at least some example approaches, an in-phase component and/or quadrature component may be compensated or corrected. For example, as illustrated in FIG. 13, at step 1312 processing circuitry compensates the in-phase component and the quadrature component, via matrix rotation (e.g., matrix rotation 610), for calculated phase error in accordance with phase estimation and, via digital gain (e.g., digital gain 612a, 612b), for gain variation. Matrix rotation (e.g., matrix rotation 610) applies matrix rotation to compensate for calculated phase error $\varphi_s(f_d)$ in accordance with phase estimation calculated by transfer function errors estimation (e.g., transfer function errors estimation 614). The application of the compensation value by matrix rotation (e.g., matrix rotation 610) updates with the same timescale of transfer function errors estimation (e.g., transfer function errors estimation 614). Digital gain (e.g., digital gain 612a, 612b) uses data from transfer function errors estimation (e.g., transfer function errors estimation 614) to compensate for variation gain of the term $G_s(f_d)$. At step 1314, processing circuitry processes the in-phase component and the quadrature component based on a plurality of frequencies of the plurality of test signals. In some embodiments, the processing of the in-phase component and the quadrature component may include Tone 1 and Tone 2 demodulator (e.g., Tone 1 and Tone 2 demodulator 616) to receive, in some embodiments, in-phase and quadrature components from the I&Q demodulator (e.g., demodulator 308) and deliver, in accordance with signals (e.g., $\sin(\omega_1 t)$, $\cos(\omega_1 t)$, $\sin(\omega_2 t)$, $\cos(\omega_2 t)$, where $\omega_1=2\pi f_1$ and $\omega_2=2\pi f_2$) received via the signal generator (e.g., signal generator 618), a number of complex and/or real numbers to the transfer function errors estimation. At step 1316, via the transfer function errors estimation (e.g., transfer function errors estimation 614), processing circuitry determines a change in demodulation phase and/or sensitivity based on the processing of the in-phase component and the quadrature component. It will be understood that the processing circuitry may also determine a change in demodulation gain based on the processing of the in-phase component and the quadrature component. Transfer function errors estimation (e.g., transfer function errors estimation 614) interpolates received complex and/or real numbers to estimate the value of the sense transfer function at the drive frequency (e.g., $H_s(f_d)$) and the variation of the phase and/or gain of $H_s(f_d)$. In some embodiments, the processing may include a matrix rotation (e.g., matrix rotation 610—CORDIC) to compensate for calculated phase error $\varphi_s(f_d)$ in accordance with phase estimation calculated by a transfer function errors estimation (e.g., transfer function errors estimation 614), and a digital gain (e.g. digital gain 612a, 612b) to compensate for gain variation of the term $G_s(f_d)$ within the in-phase (e.g., Coriolis) component and the quadrature component.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A method, comprising:
    imparting a drive signal to one or more drive electrodes of a microelectromechanical system (MEMS) sensor, the drive signal having a drive frequency;
    applying a plurality of test signals to a proof mass sense signal to create a modified proof mass sense signal, wherein the plurality of test signals comprises a plurality of frequencies, each of the plurality of frequencies different from the drive frequency;
    driving a gyroscope of the MEMS sensor based on the modified proof mass sense signal, thereby injecting the plurality of test signals into a proof mass output sense signal;
    receiving the proof mass output sense signal from the MEMS sensor;
    extracting an in-phase component and a quadrature component from the proof mass output sense signal;
    processing the in-phase component and the quadrature component based on the plurality of frequencies of the plurality of test signals; and
    determining a change in demodulation phase based on the processing of the in-phase component and the quadrature component.

2. The method of claim 1, further comprising determining a change in amplitude gain based on the processing of the in-phase component and the quadrature component.

3. The method of claim 1, wherein the plurality of test signals comprises:
    a first tone comprising a first frequency of the plurality of frequencies; and
    a second tone comprising a second frequency of the plurality of frequencies, wherein the second frequency is different from the first frequency.

4. The method of claim 3, wherein the drive frequency is greater than the first frequency and the second frequency.

5. The method of claim 3, wherein the first frequency and the second frequency are outside an intended signal bandwidth range for the proof mass sense signal.

6. The method of claim 3, wherein the modified proof mass sense signal comprises four frequencies, and wherein the four frequencies further comprise:
    a first modified proof mass sense signal frequency equal to the drive frequency less the second frequency;
    a second modified proof mass sense signal frequency equal to the drive frequency less the first frequency;
    a third modified proof mass sense signal frequency equal to the drive frequency plus the first frequency; and
    a fourth modified proof mass sense signal frequency equal to the drive frequency plus the second frequency.

7. The method of claim 3, wherein processing the in-phase component and the quadrature component based on the plurality of test signals comprises:

high frequency signal processing, wherein a test signal demodulator uses the first frequency of the first tone and the second frequency of the second tone to integrate and downsample the in-phase component and the quadrature component in accordance with a velocity of variation of a sense transfer function; and low frequency signal processing, wherein a second set of transfer function coefficients is processed via an inverse trigonometric function and an interpolation of the drive frequency to estimate a phase, and wherein an estimation of a gain is based on a square root of a sum of squares and the interpolation of the drive frequency.

8. The method of claim 1, wherein the extraction of the in-phase component and the quadrature component from the proof mass output sense signal further comprises:

creating a first baseband signal by demodulating the proof mass output sense signal based on the drive frequency; and creating a plurality of demodulated signals, wherein each of the plurality of demodulated signals are determined by demodulating the first baseband signal by each of the plurality of frequencies of the plurality of test signals.

9. The method of claim 1, wherein processing the in-phase component and the quadrature component based on the plurality of frequencies of the plurality of test signals comprises high frequency signal processing.

10. The method of claim 9, wherein the high frequency signal processing comprises a test signal demodulator integrating and downsampling the in-phase component and the quadrature component based on a particular frequency of a particular test signal, of the plurality of test signals, with a velocity of variation of a sense transfer function.

11. The method of claim 9, wherein processing the in-phase component and the quadrature component based on the plurality of frequencies of the plurality of test signals further comprises low frequency signal processing.

12. The method of claim 11, wherein the low frequency signal processing comprises processing a first set of transfer function coefficients via an inverse trigonometric function and an interpolation of the drive frequency to estimate a phase.

13. The method of claim 12, wherein the inverse trigonometric function is an arctangent function.

14. The method of claim 12, wherein an estimation of a gain is based on a square root of a sum of squares and the interpolation of the drive frequency.

15. The method of claim 14, wherein an order of the interpolation of the drive frequency is equal to 2*N−1, wherein N is a number of the plurality of test signals.

16. The method of claim 14, wherein the interpolation of the drive frequency is a third order interpolation.

17. The method of claim 14, further comprising flattening the gain and linearizing the phase with an equalizer.

18. The method of claim 1, further comprising converting a digital input to an analog output with a digital-to-analog converter (DAC), wherein a digital driver improves a stability of the drive signal at a plurality of temperatures.

19. The method of claim 18, wherein the digital driver includes a sigma delta (SD) converter or a pulse-width modulated (PWM) converter.

20. The method of claim 1, further comprising compensating the in-phase component and the quadrature component for a calculated phase error and for a gain variation.

21. A system, comprising:
processing circuitry configured to:
impart a drive signal to one or more drive electrodes of a microelectromechanical system (MEMS) sensor, the drive signal having a drive frequency;

apply a plurality of test signals to a proof mass sense signal to create a modified proof mass sense signal, wherein the plurality of test signals comprises a plurality of frequencies, each of the plurality of frequencies different from the drive frequency;

drive a gyroscope of the MEMS sensor based on the modified proof mass sense signal, thereby injecting the plurality of test signals into a proof mass output sense signal;

receive the proof mass output sense signal from the MEMS sensor;

extract an in-phase component and a quadrature component from the proof mass output sense signal;

process the in-phase component and the quadrature component based on the plurality of frequencies of the plurality of test signals; and determine a change in demodulation phase based on the processing of the in-phase component and the quadrature component.

22. The system of claim 21, further comprising determining a change in amplitude gain based on the processing of the in-phase component and the quadrature component.

23. The system of claim 21, wherein the plurality of test signals comprises:

a first tone comprising a first frequency of the plurality of frequencies; and a second tone comprising a second frequency of the plurality of frequencies, wherein the second frequency is different from the first frequency.

24. The system of claim 21, wherein the processing circuitry is further configured to compensate the in-phase component and the quadrature component for a calculated phase error and for a gain variation.

25. A gyroscope, comprising:
test signal generation circuitry;
a drive mass;
a proof mass; and
processing circuitry configured to:
impart a drive signal to one or more drive electrodes of a microelectromechanical system (MEMS) sensor, the drive signal having a drive frequency;

apply a plurality of test signals to a proof mass sense signal to create a modified proof mass sense signal, wherein the plurality of test signals comprises a plurality of frequencies, each of the plurality of frequencies different from the drive frequency;

drive the proof mass of the MEMS sensor based on the modified proof mass sense signal, thereby injecting the plurality of test signals into a proof mass output sense signal;

receive the proof mass output sense signal from the MEMS sensor;

extract an in-phase component and a quadrature component from the proof mass output sense signal;

process the in-phase component and the quadrature component based on the plurality of frequencies of the plurality of test signals; and determine a change in demodulation phase based on the processing of the in-phase component and the quadrature component.

26. The gyroscope of claim 25, further comprising determining a change in amplitude gain based on the processing of the in-phase component and the quadrature component.

27. The gyroscope of claim 25, wherein the processing circuitry is further configured to compensate the in-phase component and the quadrature component for a calculated phase error and for a gain variation.

\* \* \* \* \*